US012601370B2

(12) United States Patent　(10) Patent No.: US 12,601,370 B2
Jenkins　(45) Date of Patent: Apr. 14, 2026

(54) CABLE-DRIVEN TELESCOPIC BOOM

(71) Applicant: Eagle Technology, LLC, Melbourne, FL (US)

(72) Inventor: Stephen Jenkins, Palm Bay, FL (US)

(73) Assignee: Eagle Technology, LLC, Melbourne, FL (US)

( * ) Notice: Subject to any disclaimer, the term of this patent is extended or adjusted under 35 U.S.C. 154(b) by 280 days.

(21) Appl. No.: 18/342,939

(22) Filed: Jun. 28, 2023

(65) Prior Publication Data

US 2025/0003446 A1　Jan. 2, 2025

(51) Int. Cl.
| | |
|---|---|
| *F16C 3/03* | (2006.01) |
| *B64G 1/22* | (2006.01) |
| *B66C 23/70* | (2006.01) |
| *E04H 12/18* | (2006.01) |

(52) U.S. Cl.
CPC .............. *F16C 3/03* (2013.01); *B64G 1/2226* (2023.08); *B66C 23/703* (2013.01); *E04H 12/182* (2013.01)

(58) Field of Classification Search
CPC ..... B66C 23/705; B66C 23/703; B66C 23/36; B65G 15/26; B64G 1/22; E04H 12/18; E04H 12/182
See application file for complete search history.

(56) References Cited

U.S. PATENT DOCUMENTS

| | | | | |
|---|---|---|---|---|
| 2,675,211 | A | * | 4/1954 | Regoord ............... E04H 12/182 254/387 |
| 2,784,987 | A | | 3/1957 | Corcoran |
| 2,888,111 | A | | 5/1959 | Evans |
| 3,361,456 | A | | 1/1968 | Durand |
| 3,474,833 | A | | 10/1969 | Garrette, Jr. et al. |
| 3,666,120 | A | * | 5/1972 | Paine .................... B66C 23/703 414/565 |
| 3,688,455 | A | | 9/1972 | Zebuhr |
| 3,952,467 | A | * | 4/1976 | Partlow .................. F21V 21/38 212/348 |
| 4,047,821 | A | | 9/1977 | Hoke et al. |
| 4,062,156 | A | | 12/1977 | Roth |
| 4,079,987 | A | | 3/1978 | Bumgardener |
| 4,254,423 | A | | 3/1981 | Reinhard |
| 4,385,849 | A | | 5/1983 | Crain |

(Continued)

FOREIGN PATENT DOCUMENTS

| | | | | |
|---|---|---|---|---|
| CN | 2351417 | * | 12/1999 | ........... B66C 23/697 |
| CN | 2351417 Y | | 12/1999 | |

(Continued)

OTHER PUBLICATIONS

Extended European Search Report in corresponding European Application No. 24179678.8, dated Nov. 28, 2024, 11 pages.

*Primary Examiner* — Andrew J Triggs
(74) *Attorney, Agent, or Firm* — Edell, Shapiro & Finnan, LLC

(57) ABSTRACT

A cable-driven telescopic boom with several boom segments repositionable between stowed positions and deployed positions. The boom includes multiple spaced apart and separate cables that engage pulleys connected to each boom segment. A drive system can be used to apply tension to the cables to reconfigure the boom from a stowed configuration to a deployed configuration.

20 Claims, 23 Drawing Sheets

(56) References Cited

U.S. PATENT DOCUMENTS

| | | | | |
|---|---|---|---|---|
| 4,580,377 | A * | 4/1986 | Sundin | E04H 12/182 |
| | | | | 52/111 |
| 4,587,526 | A | 5/1986 | Ahl, Jr. | |
| 4,590,720 | A * | 5/1986 | Reed | E04H 12/182 |
| | | | | 52/632 |
| 4,657,112 | A | 4/1987 | Ream et al. | |
| 4,663,900 | A | 5/1987 | Rehm et al. | |
| 4,785,309 | A * | 11/1988 | Gremillion | H01Q 1/1235 |
| | | | | 343/901 |
| 4,793,197 | A | 12/1988 | Petrovsky | |
| 4,871,138 | A | 10/1989 | Sauter | |
| 5,035,094 | A | 7/1991 | Legare | |
| 5,101,215 | A * | 3/1992 | Creaser, Jr. | E04H 12/182 |
| | | | | 52/118 |
| 5,163,650 | A | 11/1992 | Adams et al. | |
| 5,279,084 | A | 1/1994 | Atsukawa | |
| 5,315,795 | A | 5/1994 | Chae et al. | |
| 5,624,046 | A * | 4/1997 | Zimmermann | B66C 23/708 |
| | | | | 212/230 |
| 6,095,714 | A | 8/2000 | Spencer | |
| 7,299,589 | B2 | 11/2007 | Campbell et al. | |
| 7,768,473 | B2 * | 8/2010 | Kardohely | E04H 12/182 |
| | | | | 343/883 |
| 7,966,777 | B2 * | 6/2011 | Douglas | E04H 12/182 |
| | | | | 52/118 |
| 8,381,460 | B1 * | 2/2013 | McDermott | E01D 15/124 |
| | | | | 52/118 |
| 8,522,511 | B2 * | 9/2013 | Thoren | H01Q 1/1235 |
| | | | | 52/745.18 |
| 10,005,571 | B2 | 6/2018 | Marks et al. | |
| 10,131,452 | B1 | 11/2018 | Rohweller et al. | |
| 10,550,596 | B2 * | 2/2020 | Santucci | F03D 13/40 |
| 11,339,818 | B2 | 5/2022 | Moody et al. | |
| 11,624,199 | B2 * | 4/2023 | Falck-Schmidt | B60Q 1/2657 |
| | | | | 52/111 |
| 12,180,992 | B2 * | 12/2024 | Simon | E04H 12/182 |
| 2012/0151852 | A1 * | 6/2012 | Thoren | E04H 12/182 |
| | | | | 52/111 |
| 2020/0198942 | A1 * | 6/2020 | Maini | B66C 23/708 |
| 2025/0003446 | A1 * | 1/2025 | Jenkins | B64G 1/2226 |

FOREIGN PATENT DOCUMENTS

| | | |
|---|---|---|
| CN | 2868971 Y | 2/2007 |
| CN | 103466473 A | 12/2013 |
| CN | 109335974 A | 2/2019 |
| WO | 2011/066752 A1 | 6/2011 |

* cited by examiner

CABLE-DRIVEN TELESCOPIC BOOM

TECHNICAL FIELD

The present invention relates to a telescopic boom, and in particular, to a cable-driven telescopic boom.

BACKGROUND

Antennas and instruments often need to be deployed away from a satellite to function. Conventional deployable booms include booms that are deployed by a lead screw that deploys one segment at a time, hydraulics that push all boom segments simultaneously, or a rolled beam configuration that pushes through the center of all boom segments. Other conventional booms include foldable booms. Conventional deployable booms are typically complex with many parts that can fail.

There is a need for a telescopic boom that is easy to deploy. There is also a need for a deployable boom that is easy to maintain.

SUMMARY

Disclosed herein are telescopic booms that are cable-driven. The booms include multiple telescopic boom segments that are nested in their stowed positions. In one embodiment, a telescopic boom uses several continuous tension cables to deploy the boom by moving the boom segments from their stowed positions to their deployed positions. Each of the tension cables is a continuous cable that engages each of the deployable boom segments.

In one embodiment, the boom segments are sized so that they nest within each other. In different embodiments, the quantities of boom segments in a boom can vary. While one embodiment of the boom according to the present invention includes six boom segments, in different embodiments, the boom may include a quantity of boom segments other than six.

A continuous cable boom according to the present invention also prevents the need to have the cable-driven system be significantly pretensioned, which reduces boom "self-deploying" behavior upon release of a restraint that holds the boom segments in their stowed positions. In addition, the boom segments have novel cross-sections that enable the cable-driven system to be used while maintaining extremely tight nesting between adjacent boom sections or segments.

In one embodiment of the present invention, a telescopic boom is positionable in a stowed configuration and in a deployed configuration, the telescopic boom comprising a first boom segment having a first end and a second end opposite the first end, a second boom segment having its own first end and its own second end opposite its own first end, the second boom segment being positionable inside the first boom segment, and a drive mechanism connected to each of the first boom segment and the second boom segment, the drive mechanism including a cable and a motor that can apply tension to the cable, the cable is engaged with the first boom segment at a first location proximate to the first end of the first boom segment and at a second location proximate to the second end of the first boom segment, the cable is engaged with the second boom segment at a third location proximate to the first end of the second boom segment and at a fourth location proximate to the second end of the second boom segment, wherein the cable extends continuously between the first location, the second location, the third location, and the fourth location, and the drive mechanism can be actuated to apply tension to the cable to move the telescopic boom from its stowed configuration to its deployed configuration.

In an alternative embodiment, the first boom segment has a first inner diameter, the second boom segment has a second inner diameter, and the second inner diameter is smaller than the first inner diameter. In another embodiment, the first boom segment has a first pulley at the first location and a second pulley at the second location, the second boom segment has a third pulley at the third location and a fourth pulley at the fourth location, and the cable engages each of the first pulley, the second pulley, the third pulley, and the fourth pulley. In yet another embodiment, the first end of the second boom segment is proximate to the first end of the first boom segment when the telescopic boom is in its stowed configuration, and the second end of the second boom segment is proximate to the first end of the first boom segment when the telescopic boom is in its deployed configuration, the cable remaining engaged with the first pulley, the second pulley, the third pulley, and the fourth pulley in both the stowed configuration and the deployed configuration.

In another embodiment, the first boom segment and the second boom segment have a common longitudinal axis, and the cable extends parallel to the longitudinal axis between the first location, the second location, the third location, and the fourth location. Alternatively, the cable is a first cable, the drive mechanism includes a second cable and a third cable, the first cable, the second cable, and the third cable being equally spaced apart around a circumference of the first boom segment, and each of the second cable and the third cable engaging the first boom segment proximate to its first end and its second end and engaging the second boom segment proximate to its first end and its second end. In another embodiment, the first boom segment has a first set of pulleys, a second set of pulleys, and a third set of pulleys, the second boom segment has a fourth set of pulleys, a fifth set of pulleys, and a sixth set of pulleys, the first cable engaging the first set of pulleys and the fourth set of pulleys, the second cable engaging the second set of pulleys and the fifth set of pulleys, and the third cable engaging the third set of pulleys and the sixth set of pulleys.

In another embodiment, the second boom segment includes a tube tip fitting coupled to its first end, the tube tip fitting including an outer side and an inner side, the tube tip fitting including a pulley coupled thereto, the pulley being located on the inner side of the tube tip fitting. In an alternative embodiment, the telescopic boom further comprises a base coupled to the second end of the first boom segment, and a restraint pawl movably coupled to the base, the restraint pawl being disposable in a stowed position in which the restraint pawl prevents the telescopic boom from moving from its stowed configuration to its deployed configuration and in a deployed position in which the restraint pawl allows the telescopic boom to move from its stowed configuration to its deployed configuration. In addition, each of the first boom segment and the second boom segment includes a base plate coupled proximate to its second end, each of the base plates includes an opening extending therethrough, and the telescopic boom further comprises a restraint system that is used to lock the boom segments together in stowed positions in which the telescopic boom is prevented from moving from its stowed configuration to its deployed configuration. Also, the telescopic boom also includes a coupler having a projection extending therefrom, the coupler being engaged with the second boom segment, the projection extending through a first hole in the second boom segment and a second hole in the base plate of the second boom segment, thereby coupling the base plate of the second boom segment to the second boom segment.

In another embodiment, the telescopic boom further comprises a third boom segment having opposite ends and being positionable inside the second boom segment, the third boom segment having a fifth location proximate to one of its ends and a sixth location proximate to the other of its ends, a fourth boom segment having opposite ends and being positionable inside the third boom segment, the fourth boom segment having a seventh location proximate to one of its ends and an eighth location proximate to the other of its ends, and a fifth boom segment having opposite ends and being positionable inside the fourth boom segment, the fifth boom segment having a ninth location proximate to one of its ends and a tenth location proximate to the other of its ends, wherein the cable engages the third boom segment at the fifth location and at the sixth location, the fourth boom segment at the seventh location and at the eighth location, and the fifth boom segment at the ninth location and at the tenth location. In yet another embodiment, the third boom segment has a fifth pulley at the fifth location and a sixth pulley at the sixth location, the fourth boom segment has a seventh pulley at the seventh location and an eighth pulley at the eighth location, the fifth boom segment has a ninth pulley at the ninth location, and the cable engages each of the fifth pulley, sixth pulley, seventh pulley, eighth pulley, and ninth pulley.

Alternatively, each of the first boom segment, the second boom segment, the third boom segment, the fourth boom segment, and the fifth boom segment includes at least one latch assembly, and each latch assembly has a retracted configuration and a latched configuration, each latch assembly being mounted on one of the boom segments and engaging another of the boom segments to retain adjacent boom segments in deployed positions. In addition, each latch assembly includes a spring-biased plunger that is preloaded so that the latch assembly engages a corresponding bushing in an adjacent boom segment when the boom segments are moved to deployed positions.

In another embodiment of the present invention, a telescopic boom is positionable in a stowed configuration and in a deployed configuration, the telescopic boom comprising a first boom segment having opposite ends, a second boom segment having opposite ends, the second boom segment being positionable inside the first boom segment, and a drive assembly comprising a first cable, a second cable, a third cable, each of the first cable, the second cable, and the third cable being engaged with each of the first boom segment and the second boom segment, and each of the first cable, the second cable, and the third cable being equally spaced apart from the others of the first cable, the second cable, and the third cable around the first boom segment and the second boom segment, and an actuator that can apply tension to each of the first cable, the second cable, and the third cable to move the second boom segment from a stowed position to a deployed position relative to the first boom segment.

In an alternative embodiment, the first boom segment has a first set of pulleys, a second set of pulleys, and a third set of pulleys, the second boom segment has a fourth set of pulleys, a fifth set of pulleys, and a sixth set of pulleys, the first cable engages the first set of pulleys and the fourth set of pulleys, the second cable engages the second set of pulleys and the fifth set of pulleys, and the third cable engages the third set of pulleys and the sixth set of pulleys. Alternatively, the first boom segment includes a latch assembly that has a retracted configuration and a latched configuration, the latch assembly being mounted on the first boom segment and selectively engageable with the second boom segment to retain the second boom segment in its deployed position relative to the first boom segment.

In another embodiment of the present invention, a telescopic boom is positionable in a stowed configuration and in a deployed configuration, the telescopic boom comprises a base portion, a first boom segment having a first end and a second end opposite the first end, the second end being coupled to the base portion, a second boom segment having a third end and a fourth end opposite the third end, at least a portion of the second boom segment being positionable inside the first boom segment, a third boom segment having a fifth end and a sixth end opposite the fifth end, at least a portion of the third boom segment being positionable inside the second boom segment, and a drive assembly including a spool, an actuator coupled to the spool, and a cable engaged with the spool, wherein the cable is engaged with the base portion, the first boom segment at a first location proximate to the first end of the first boom segment and at a second location proximate to the second end of the first boom segment, the second boom segment at a third location proximate to the first end of the second boom segment and at a fourth location proximate to the second end of the second boom segment, and the third boom segment at a fifth location proximate to the first end of the third boom segment and at a sixth location proximate to the second end of the third boom segment, the cable extending continuously between the spool, the base, the first location, the second location, the third location, the fourth location, the fifth location, and the sixth location, and the actuator can be actuated to move the spool to apply tension to the cable to move the second boom segment and the third boom segment so that the telescopic boom moves from its stowed configuration to its deployed configuration.

Alternatively, the first boom segment has a first pulley at the first location and a second pulley at the second location, the second boom segment has a third pulley at the third location and a fourth pulley at the fourth location, the third boom segment has a fifth pulley at the fifth location and a sixth pulley at the sixth location, and the base includes a seventh pulley, the cable engaging each of the first pulley, the second pulley, the third pulley, the fourth pulley, the fifth pulley, the sixth pulley, and the seventh pulley.

In one embodiment, each of the first boom segment, the second boom segment, the third boom segment, the fourth boom segment, and the fifth boom segment has a cross-sectional shape that is different from the cross-sectional shapes of the other boom segments.

These and other advantages and features will become evident in view of the drawings and detailed description.

DETAILED DESCRIPTION

In one embodiment of the present invention, a boom assembly is telescopic and includes several boom segments. The boom segments are nested in a stowed configuration and can be moved to extended or deployed positions so that the boom is reconfigured to a deployed configuration. The boom segments are repeatably latched out at their end of travel locations or positions. The boom segments are extended via one or more continuous, integrated deployable cables that are in tension and that engage each of the boom segments. Each of the cables engages pulleys that are coupled to each of the boom segments. The cables are equally spaced around the circumference of the boom segments.

In one embodiment, a plurality of continuous deployment cables are used for mission redundancy or stiffness requirements. In one embodiment, the boom segment position locking at the end of travel can be pin latches or spreader latches. In other embodiments, the locking out mechanism can be any device that locks and retains the two segments together.

In one embodiment, the boom segments are retracted manually once the latches retaining the boom segments in their deployed positions are actuated. In an alternative embodiment, a separate "stow" cable could be used to add reversibility to the telescopic boom, namely, to assist with reconfiguring the boom to its stowed or retracted configuration by moving the boom segments.

In one embodiment, the boom segments nominally deploy simultaneously. In an alternative embodiment, the release and movement of the boom segments could be serially controlled with an additional staging mechanism. Also, the boom segments can be partially or fully nested in different implementations.

Three equally spaced device cables are reeled in on a single spool. The multiple cables are used to keep the boom segments "centered." Cables are lightly tensioned in a stowed state, and can be slack deployed. In an alternative embodiment, the cables could be slack stowed too.

Pulleys located on root and tip fittings act to pull the root of smaller boom segments to the tip of the adjacent larger boom segment during deployment. Also, in the illustrated embodiment, the boom is manually moved from its deployed configuration to its stowed configuration.

Figure 1:
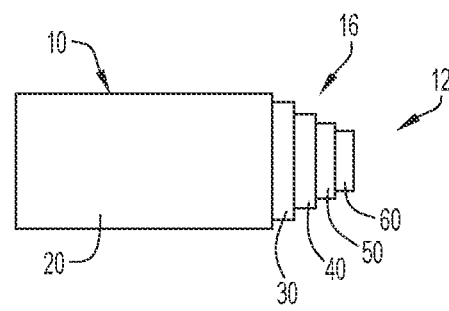
FIG. 1 is a schematic drawing of a telescopic boom in a stowed configuration according to the present invention.

Referring to FIG. 1, a schematic drawing of a telescopic boom in a stowed configuration according to the present invention is illustrated. The telescopic boom 10 has a stowed configuration 12 and includes several segments, and in this embodiment, includes segments 20, 30, 40, 50, and 60. Each of the telescopic boom segments is shown in its retracted or stowed position 16 in FIG. 1. Telescopic boom segment 30 has an outer diameter that is smaller than the inner diameter of telescopic boom segment 20, thereby allowing nearly all of telescopic boom segment 30 to fit inside telescopic boom segment 20 in a telescopic manner. Similarly, each of telescopic boom segments 40, 50, and 60 has an outer diameter that is smaller than the inner diameter of telescopic boom segments 30, 40, and 50, respectively, thereby allowing them to be inserted into the respective slightly larger adjacent telescopic boom segment.

Figure 2:
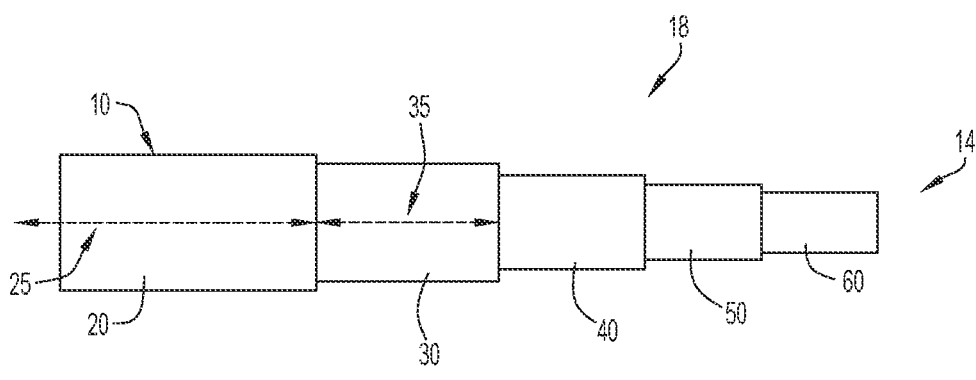
FIG. 2 is a schematic drawing of the boom of FIG. 1 in a deployed configuration.

The telescopic boom 10 can be reconfigured from its stowed configuration 12 shown in FIG. 1 to a deployed or extended configuration 14, as shown in FIG. 2. In this deployed configuration 14, each of the telescopic boom segments 30, 40, 50, and 60 has been moved to its deployed position 18. In this embodiment, the telescopic boom segments 30, 40, 50, and 60 are moved to their deployed positions 18 via a cable-driven driven assembly, an embodiment of which is described in detail below.

In one embodiment, each of the telescopic boom segments 20, 30, 40, 50, and 60 has a generally circular cross-section and is cylindrical in its overall shape. In other embodiments, the telescopic boom segments may have a cross-sectional shape other than a circle, such as an oval, a square, a rectangle, or other geometric shape.

Telescopic boom segment 20 has a longitudinal axis 25 that extends from one end of segment 20 to the other end of segment 20. Similarly, telescopic boom segment 30 has a longitudinal axis 35 that extends from one end of segment 30 to the other end of segment 30. Longitudinal axis 25 is colinear with longitudinal axis 35. Each of telescopic boom segments 40, 50, and 60 has its own longitudinal axis (not shown) that is colinear with axes 25 and 35.

Figure 3:
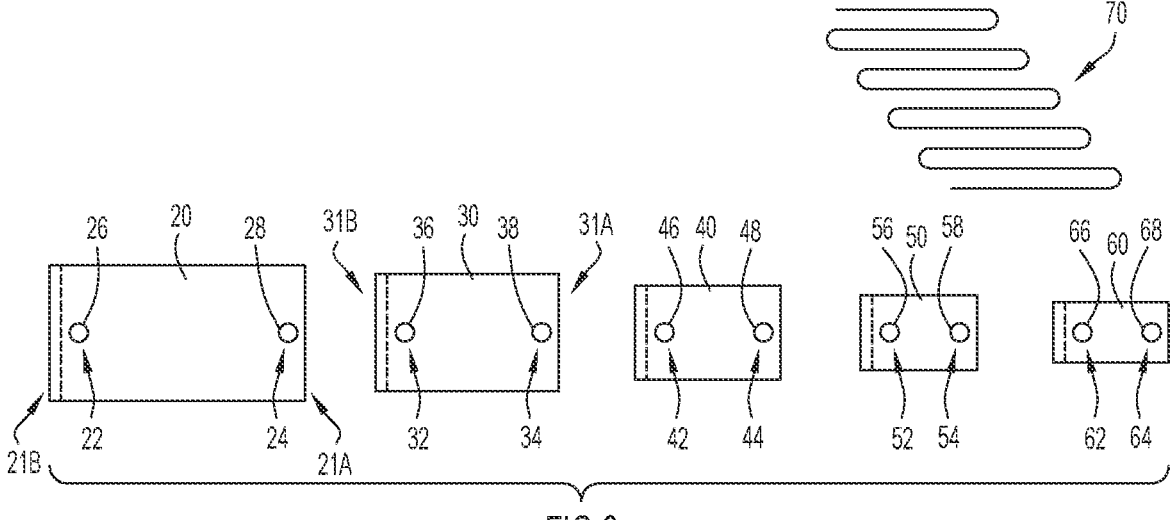
FIG. 3 is an exploded schematic drawing of several components of the boom of FIG. 1.

Referring to FIG. 3, an exploded schematic drawing of several components of the telescopic boom 10 is illustrated. The various telescopic boom segments 20, 30, 40, 50, and 60 are separated from each other, and a cable 70 that engages each of the telescopic boom segments 20, 30, 40, 50, and 60 is shown as well. According to the present invention, the cable 70 is a single cable that is not made up of multiple smaller cable pieces coupled together. In this arrangement, the cable 70 extends from a drive mechanism (not shown) and engages each of the telescopic boom segments 20, 30, 40, 50, and 60 at multiple locations to reconfigure the telescopic boom 10 to its deployed configuration 14 when tension is applied to the cable 70.

By using a single cable as opposed to multiple cable segments coupled end to end to form a combined cable, the need to preload the cable segments is eliminated. In addition, any concerns about the applied tension being inconsistently applied to the different cable segments is also eliminated. Also, if one of the cable segments were to fail and break, that particular segment would have to be replaced, thereby creating inconsistent properties between the cable segments that have been combined together to form a single cable. Thus, there are numerous benefits to using a single cable that engages each of the boom segments in a telescopic boom as opposed to using a segmented cable. The cable extends parallel to the longitudinal axes of the boom segments. In addition, the cable remains engaged with the pulleys of the boom segments in both the stowed configuration and the deployed configuration.

Referring to FIG. 3, telescopic boom segment 20 has two opposite ends 21A and 21B. Proximate to end 21A is a location 24 that is engaged by the cable 70. Similarly, proximate to end 21B is a location 22 that is engaged by the cable 70. In this embodiment, a pulley 28 is located at location 24, and another pulley 26 is located at location 22. The cable 70 engages each of the pulleys 26 and 28.

Similarly, telescopic boom segment 30 has two opposite ends 31A and 31B. Proximate to end 31A is a location 34 that is engaged by the cable 70. Similarly, proximate to end 31B is a location 32 that is engaged by the cable 70. In this embodiment, a pulley 38 is located at location 34, and another pulley 36 is located at location 32. The cable 70 engages each of the pulleys 36 and 38.

In this embodiment, telescopic boom segments 40, 50, and 60 are similarly structured. Telescopic boom segment 40 has pulleys 46 and 48 at locations 42 and 44, respectively, near its opposite ends. Telescopic boom segment 50 has pulleys 56 and 58 at locations 52 and 54, respectively, near its opposite ends. Telescopic boom segment 60 has pulleys 66 and 68 at locations 62 and 64, respectively, near its opposite ends.

Figure 4:
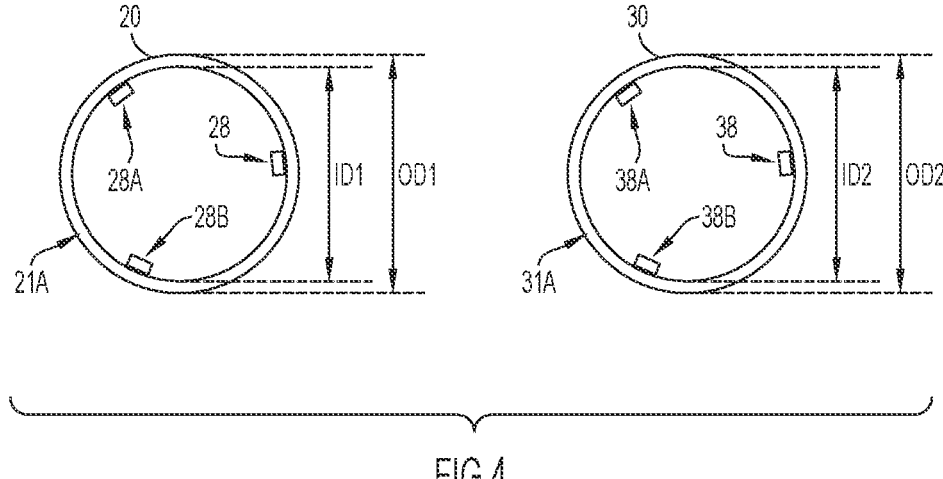
FIG. 4 is an end view of two telescopic boom segments of the boom of FIG. 1.
Figure 5:
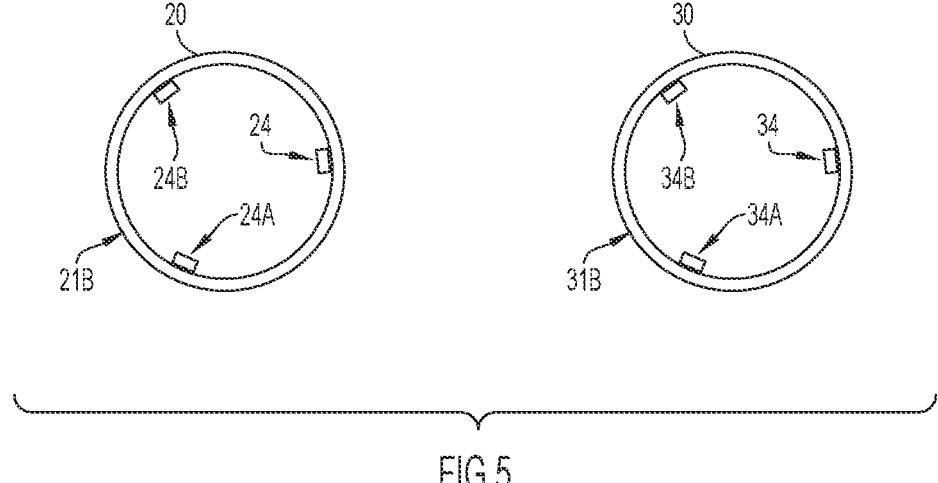
FIG. 5 is an end view of the two boom segments of FIG. 4 showing the opposite ends thereof.

Turning to FIGS. 4 and 5, opposite end views of telescopic boom segments 20 and 30 are illustrated. In FIG. 4, end 21A of telescopic boom segment 20 and end 31A of telescopic boom segment 30 are shown, and in FIG. 5, end 21B of telescopic boom segment 20 and end 31B of telescopic boom segment 30 are shown. Telescopic boom segment 20 has an inner diameter ID1 and an outer diameter OD1. Similarly, telescopic boom segment 30 has an inner diameter ID2 and an outer diameter OD2. In this embodiment, inner diameter ID1 is larger than outer diameter OD2, thereby allowing at least a portion of and/or all of telescopic boom segment 30 to be inserted into telescopic boom segment 20.

Telescopic boom segment 20 has several pulleys 28, 28A, and 28B located proximate to end 21A (see FIG. 4) and several pulleys 24, 24A, and 24B located proximate to end 21B (see FIG. 5). Pulleys 28 and 24 are aligned along the longitudinal axis 25 of telescopic boom segment 20 and form a first set of pulleys that are engaged by cable 70. Pulleys 28A and 24A are similarly aligned along axis 25 and form a second set of pulleys that are engaged by another, second cable (not shown) that extends along axis 25. Also, pulleys 28B and 24B are aligned along axis 25 and form a third set of pulleys that are engaged by another, third cable (not shown) that extends along axis 25. The first set, second set, and third set of pulleys are spaced equally about the circumference of boom segment 20, and in this embodiment, are located along the inner surface of boom segment 20.

Similarly, boom segment 30 has several pulleys 38, 38A, and 38B located proximate to end 31A (see FIG. 4) and several pulleys 34, 34A, and 34B located proximate to end 31B (see FIG. 5). Pulleys 38 and 34 are aligned along the longitudinal axis 35 of boom segment 30 and form a first set of pulleys that are engaged by cable 70. Pulleys 38A and 34A are aligned along axis 35 and form a second set of pulleys that are engaged by another, second cable (not shown) that extends along axis 35. Also, pulleys 38B and 34B are aligned along axis 35 and form a third set of pulleys that are engaged by another, third cable (not shown) that extends along axis 35. The first set, second set, and third set of pulleys are spaced equally about the circumference of boom segment 30, and in this embodiment, are located along the inner surface of boom segment 30.

Figure 6:
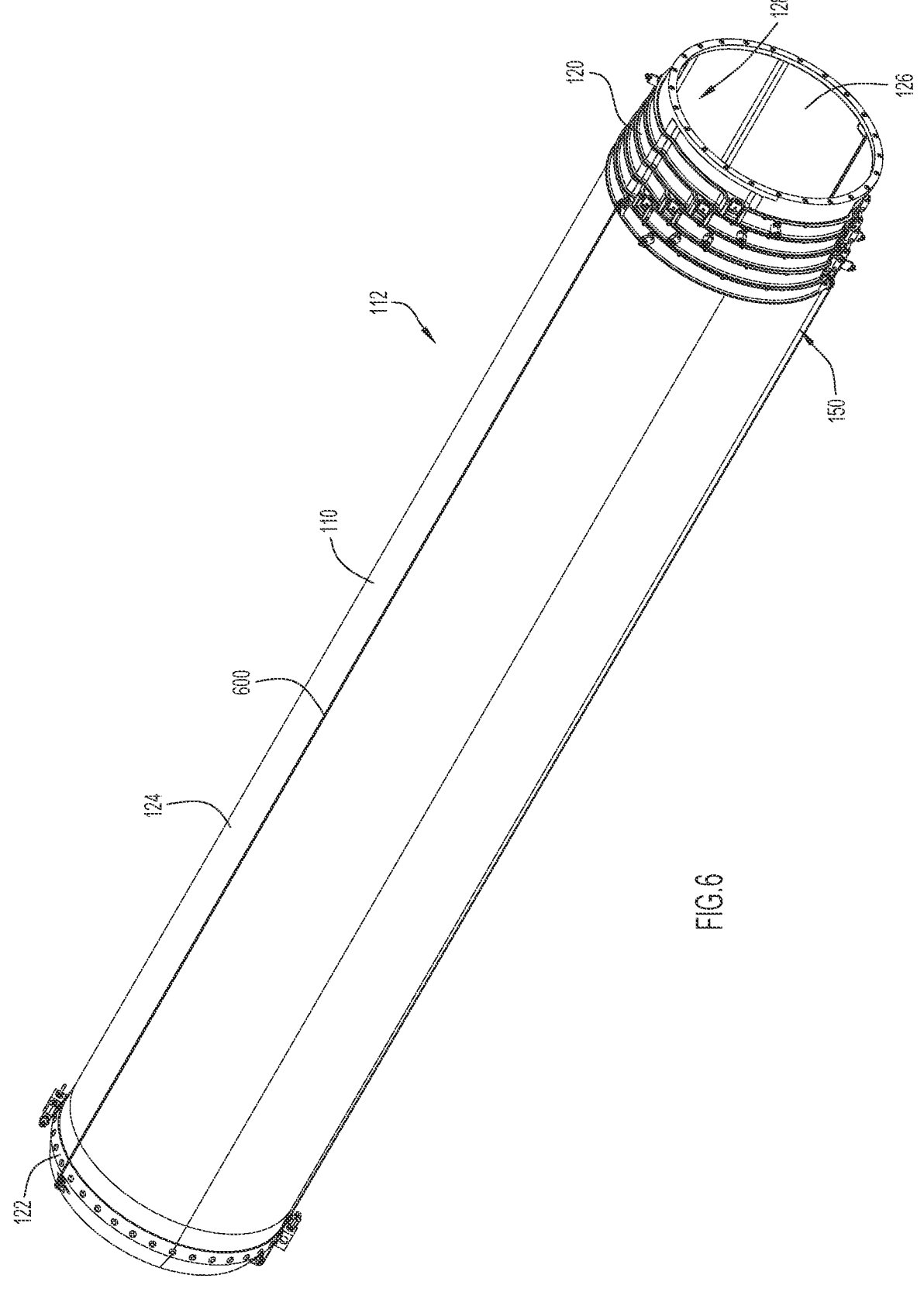
FIG. 6 is a perspective view of an embodiment of a telescopic boom in a stowed configuration according to the present invention.

Turning to FIG. 6, a perspective view of an embodiment of a telescopic boom in a stowed configuration according to the present invention is illustrated. Telescopic boom 110 is shown in its stowed configuration 112 and has a nested tube arrangement 150. The telescopic boom 110 has a first or distal end 120, an opposite second or proximal end 122, an outer surface 124, and an inner surface 126 that defines a channel 128. The telescopic boom 110 includes a cable 600 that extends from a drive mechanism proximate to end 122 along the outer surface 124 to end 120.

Figure 7:
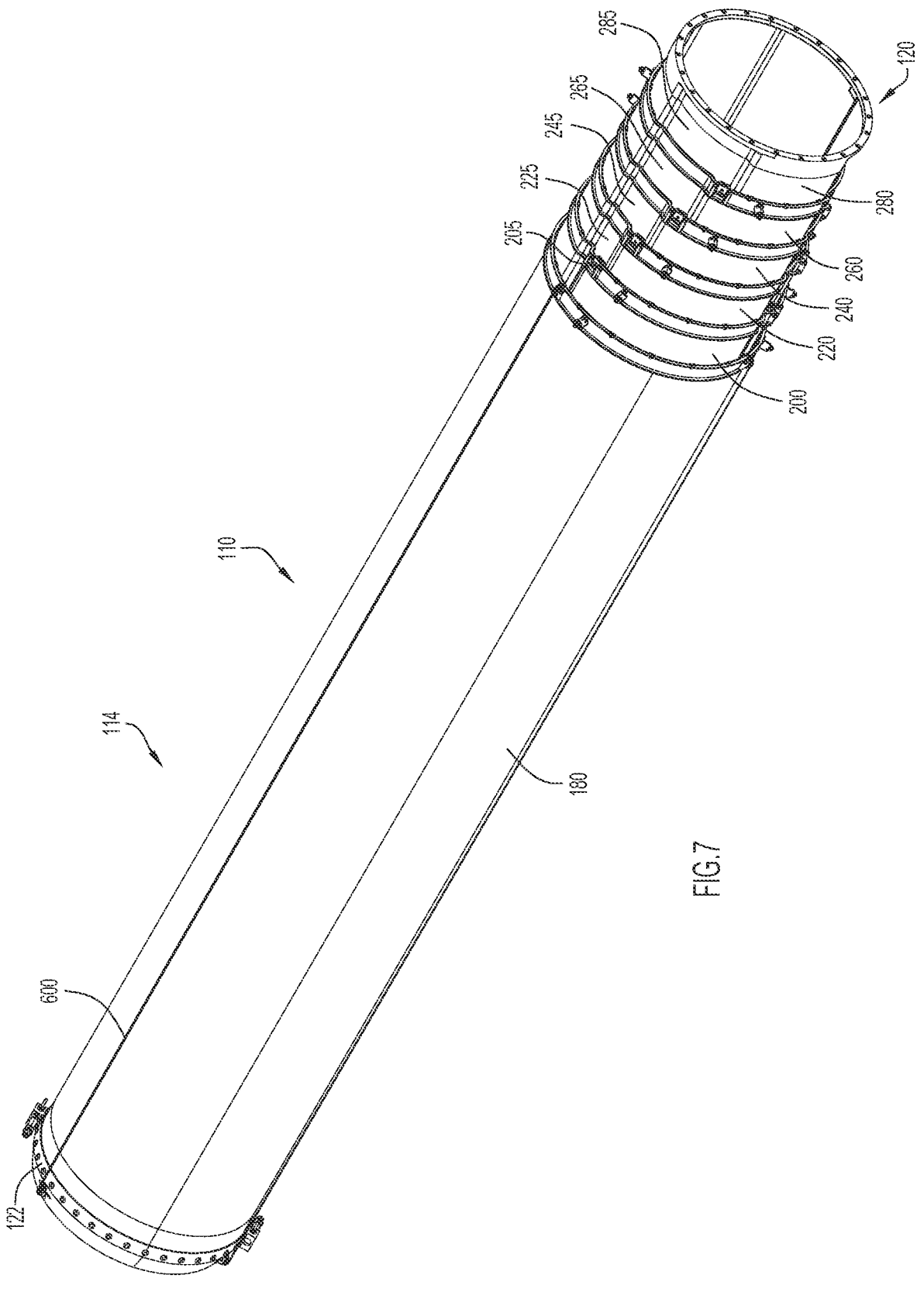
FIG. 7 is a perspective view of the boom of FIG. 6 in a partially deployed configuration.

Referring to FIG. 7, a perspective view of the boom 110 in a partially deployed configuration is illustrated. While boom 110 is shown in partially deployed configuration 14, it is to be understood that boom 110 can be reconfigured to a more fully deployed configuration that has a greater length than that illustrated in FIG. 7. While end 122 is stationary, end 120 moves as the boom 110 is reconfigured.

In this embodiment, boom 100 includes an outer telescopic boom segment 180 and several inner telescopic boom segments 200, 220, 240, 260, and 280, each of which nests within an adjacent, slightly larger boom segment. The boom segments 200, 220, 240, 260, and 280 can be referred to alternatively as tubes. In one embodiment, each of the boom segments 200, 220, 240, 260, and 280 has the same length. Also, the radius of each boom segment is 0.125 inches less than the radius of the adjacent, larger boom segment. This tight tolerance maximizes the nesting ability of the boom segments while also maximizing the overall strength of the boom 110.

As shown in more detail below, each of the boom segments 200, 220, 240, 260, and 280 includes a groove formed therein that allows for the cable 600 to be positioned between and extend along the length of that boom segment and the adjacent larger boom segment. In particular, boom segment 200 includes a groove 205 that allows cable 600 to extend between boom segment 180 and boom segment 200. Boom segment 220 includes a groove 225 that allows cable 600 to extend between boom segment 200 and boom segment 220. Boom segment 240 includes a groove 245 that allows cable 600 to extend between boom segment 220 and boom segment 240. Boom segment 260 includes a groove 265 that allows cable 600 to extend between boom segment 240 and boom segment 260. Boom segment 280 includes a groove 285 that allows cable 600 to extend between boom segment 260 and boom segment 280.

Figure 8:
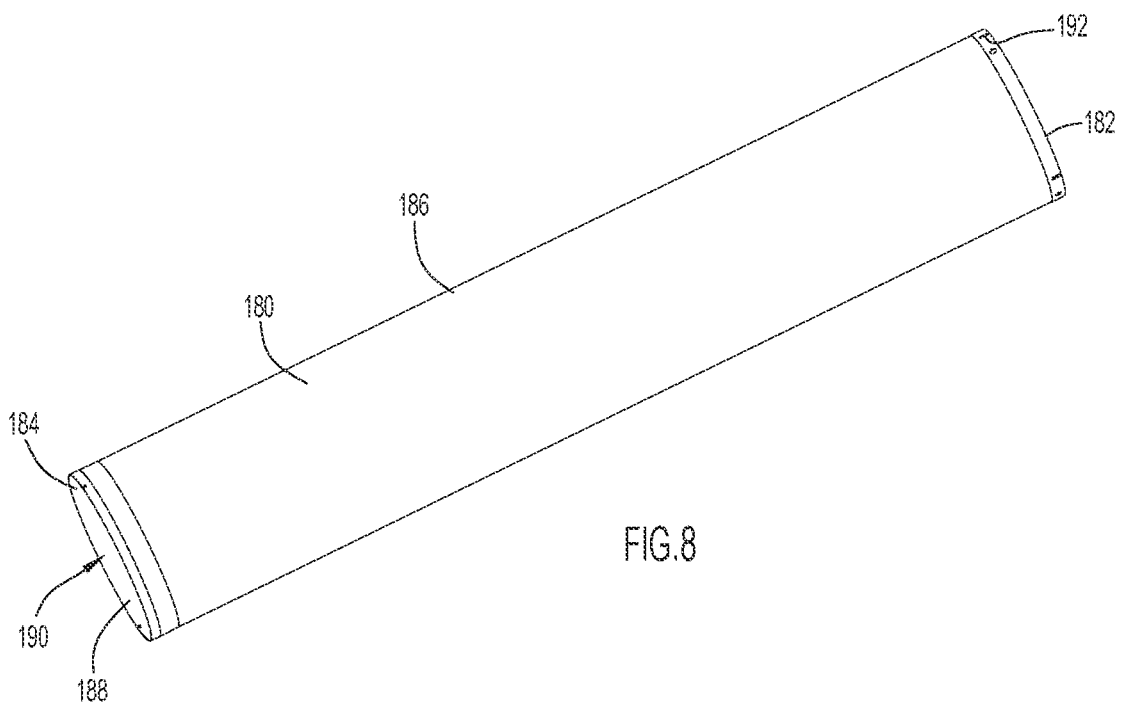
FIG. 8 is a side view of a boom segment of the boom of FIG. 6.

Referring to FIG. 8, a side perspective view of telescopic boom segment 180 is illustrated. In this embodiment, telescopic boom segment 180 has opposite ends 182 and 184, an outer surface 186, and an inner surface 188 defining a channel 190. In addition, proximate to end 182 is a notch 192 formed in boom segment 180.

Figure 9:
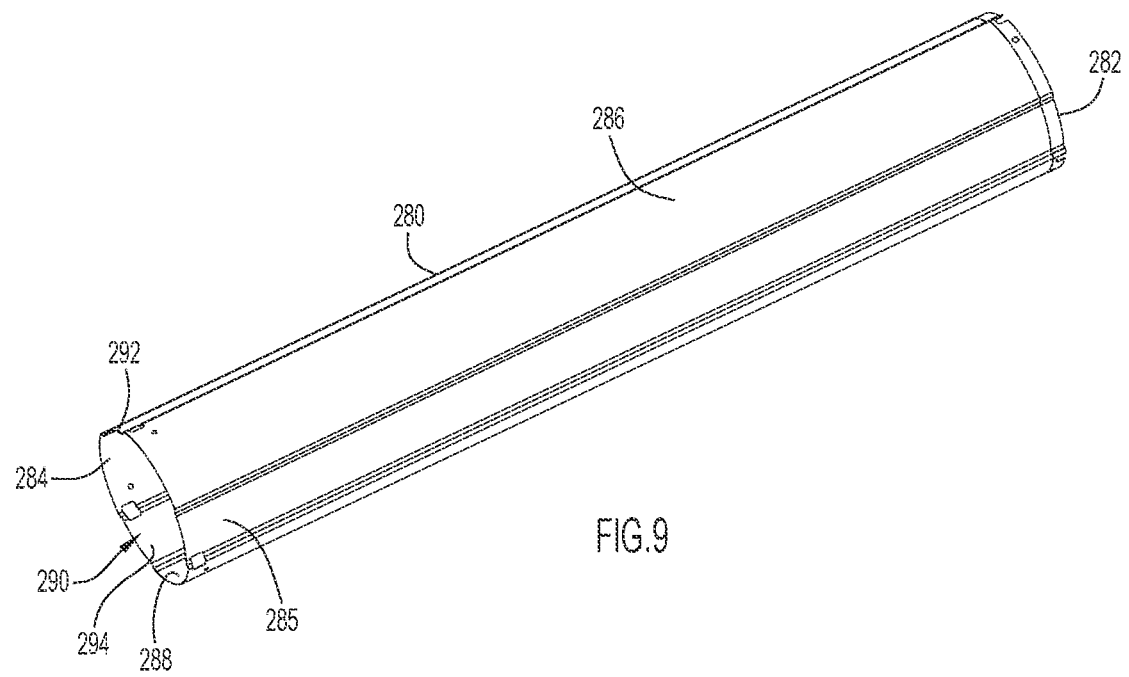
FIG. 9 is a perspective view of another boom segment of the boom of FIG. 6.

Referring to FIG. 9, a side perspective view of telescopic boom segment 280 is illustrated. Boom segment 280 has opposite ends 282 and 284, an outer surface 286, and an inner surface 288 that defines an internal channel 290. As shown, the outer surface 286 of boom segment 280, which is the innermost segment in boom 110, is different than the outer surface 186 of boom segment 180. While only one groove section 285 in boom segment 280 was illustrated in FIG. 7, boom segment 280 includes three groove sections formed in its outer surface 286, each of which is equally spaced apart from the other two. Groove sections 285, 292, and 294 are formed in boom segment 280 to allow for three different spaced apart cables to pass between boom segment 260 and 280. Also, each of the groove sections 285, 292, and 294 is sized to accommodate the groove section of the adjacent larger boom section. Each of the boom segments 180, 200, 220, 240, 260, and 280 has a few holes and/or notches formed therein, the function of which is described in detail below.

Figure 10:
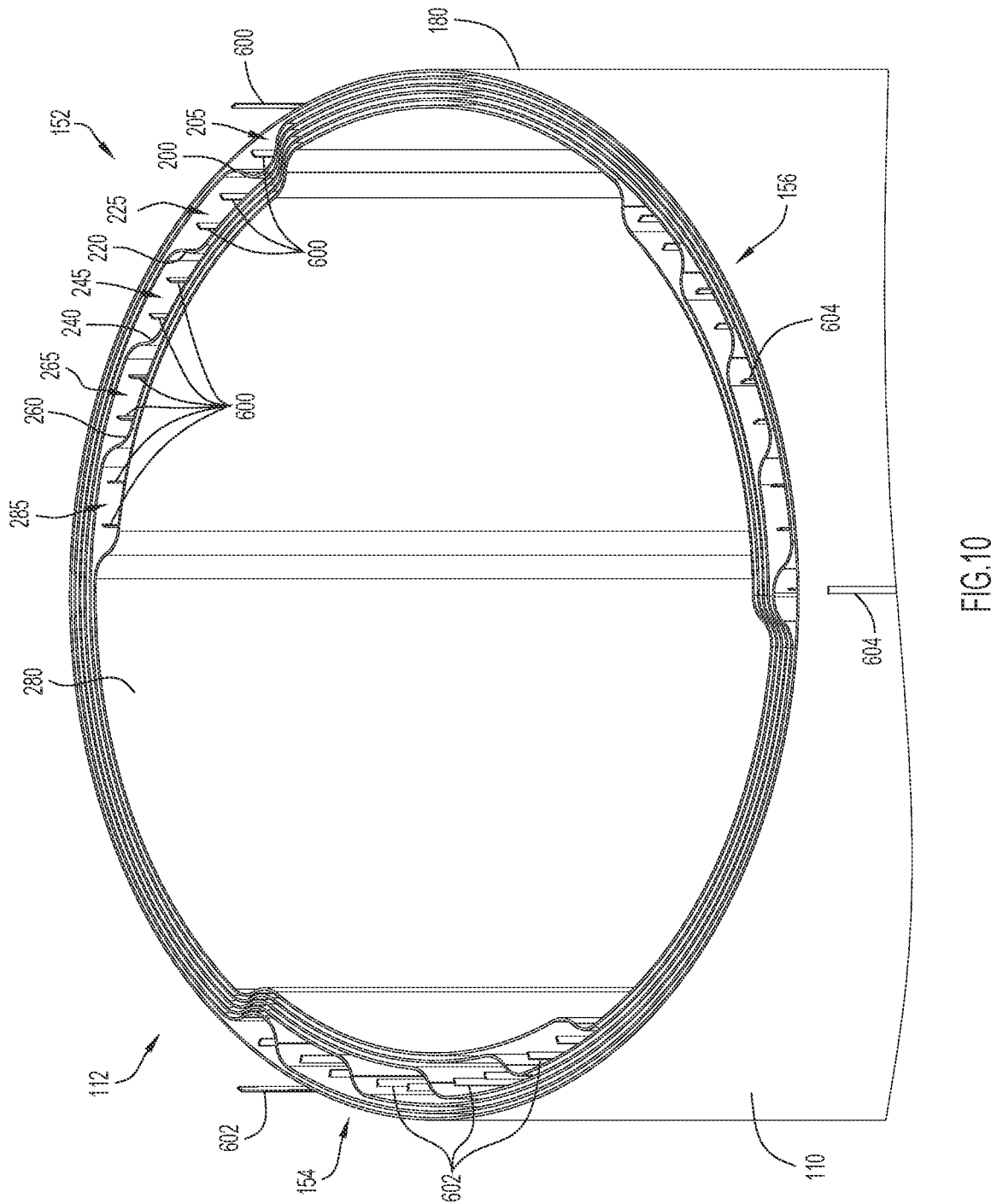
FIG. 10 is a cross-sectional view of the nested or stowed boom tubes of FIG. 6.

Turning to FIG. 10, a cross-sectional view of the nested or stowed boom tubes of the telescopic boom 110 is shown. The boom 110 has three different groove sections 152, 154, and 156, each of which accommodates one of the cables 600, 602, and 604 extending between the boom segments as shown.

Groove section 152 is the section described above relative to FIG. 7. Groove section 152 shows the various grooves or groove portions formed in each of the boom segments. Cable 600 travels along the outer surface of boom segment 180, engages a pulley on boom segment 180, and returns to the base or proximal end 182 of boom segment 180 along its inner surface. Boom segment 200 includes groove 205 that accommodates cable 600 between the outer surface of boom segment 200 and the inner surface of boom segment 180.

Boom segment 220 includes a slightly larger groove 225 that accommodates cable 600 and groove 205. Cable 600 travels from the proximal end of boom segment 220 to the distal end of boom segment 220, around a pulley located proximate to the distal end of boom segment 220 and back along boom segment 220 in groove 225 between the outer surface of boom segment 220 and the inner surface of boom segment 200. The truncated lines for cable 600 in groove 225 represent the part of cable 600 extending from the distal end to the proximal end of boom segment 220 and the part of cable 600 extending from the proximal end to the distal end of boom segment 220.

Similarly, boom segment 240 includes a slightly larger groove 245 that accommodates cable 600 and grooves 205 and 225. Cable 600 travels back and forth from the proximal end of boom segment 240 to the distal end of boom segment 240, and around a pulley located proximate to the distal end of boom segment 240. The cable 600 then travels between the outer surface of boom segment 240 and the inner surface of boom segment 220.

Also, boom segment 260 includes a slightly larger groove 265 that accommodates cable 600 and grooves 205, 225, and 245. Cable 600 travels back and forth from the proximal end of boom segment 260 to the distal end of boom segment 260, and around a pulley located proximate to the distal end of boom segment 260. The cable 600 travels between the outer surface of boom segment 260 and the inner surface of boom segment 240. Similarly, boom segment 280 includes a slightly larger groove 285 that accommodates cable 600 and grooves 205, 225, 245, and 265. Cable 600 travels back and forth from the proximal end of boom segment 280 to the distal end of boom segment 280, and around a pulley located proximate to the distal end of boom segment 280. The cable 600 then travels between the outer surface of boom segment 280 and the inner surface of boom segment 260.

As shown in FIG. 10, each of the boom segments 200, 220, 240, 260, and 280 includes similar additional groove structures that form groove section 154 for cable 602 and groove section 156 for cable 604.

Figure 11:
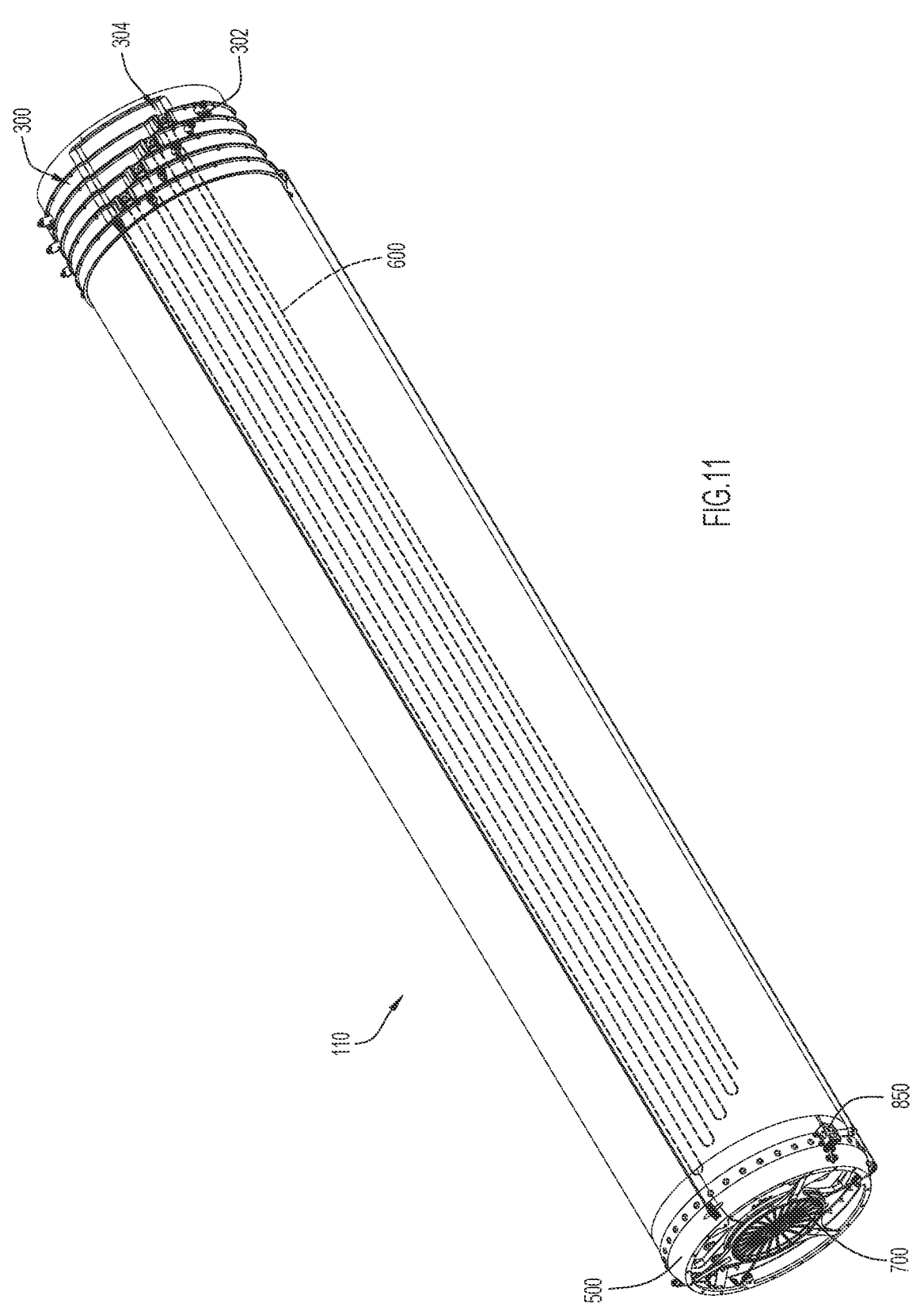
FIG. 11 is a perspective view of the boom of FIG. 6 fully assembled showing one of the cables located internally in the telescopic boom.

Referring to FIG. 11, a perspective view of the telescopic boom 110 is illustrated. Boom 110 is shown with its boom segments 180, 200, 220, 240, and 260 having tip fittings 300 located on their distal ends and bonded thereto. Each tip fitting 300 extends circumferentially around the distal end of the boom segment to which it is coupled. Each tip fitting 300 includes a latch or latch assembly 302 and a pulley 304. At the other end of boom 110 is a base 500 that is coupled to the outermost boom segment 180. The boom 110 also includes a drive mechanism 700 located proximate to base 500 and multiple restraints 850 (only one is shown) that retain the boom segments in their stowed positions. In this embodiment, the innermost boom segment 280 does not have the same tip fitting 300 because cable 600 (shown in FIG. 11 for illustrative purposes only because the majority of the cable 600 is located internally) terminates at the distal end of boom segment 280.

Figure 12A:
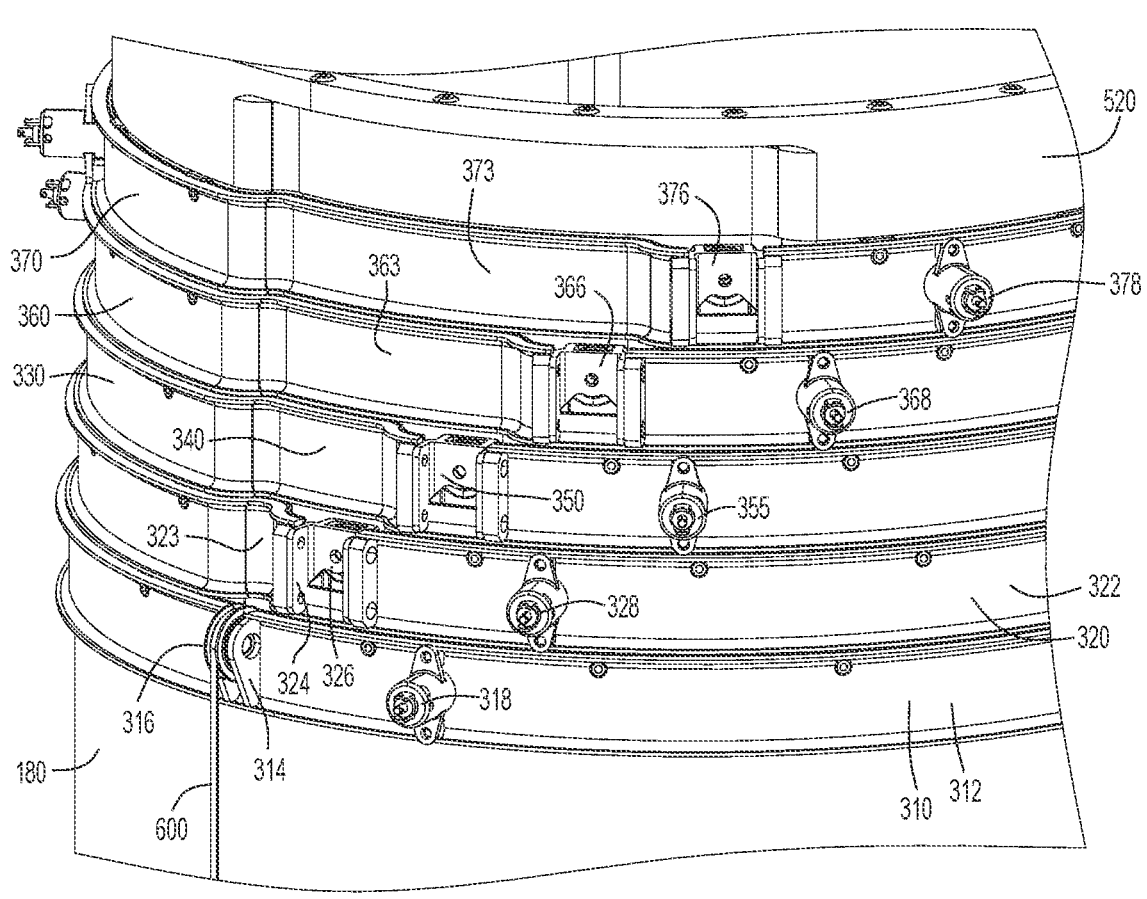
FIGS. 12A and 12B are close-up views of the outer ends of the boom segments of the boom of FIG. 6 showing the tip fittings coupled thereto.
Figure 12B:
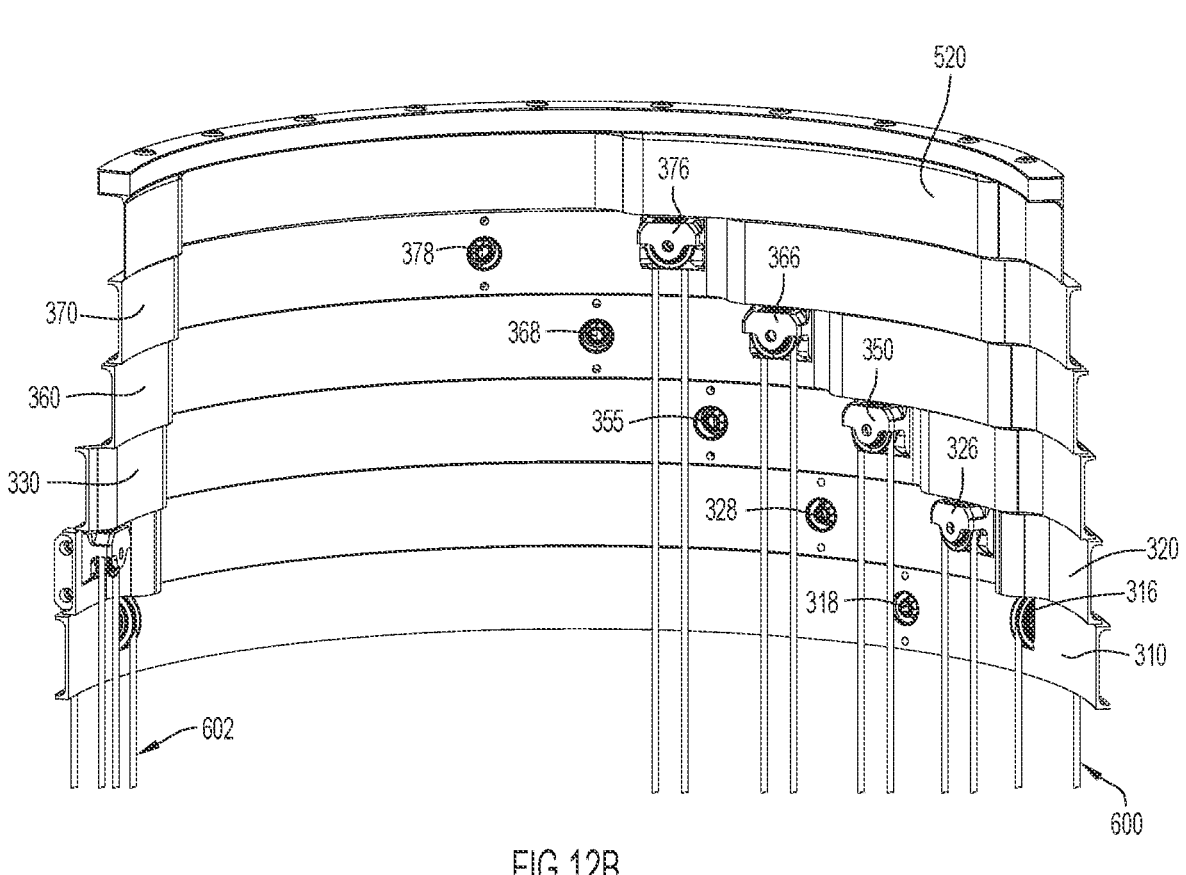

Referring to FIGS. 12A and 12B, close-up views of the outer ends of the boom segments of boom 110 are illustrated showing the tip fittings coupled thereto from an outside (perspective) view and an inside (cross-sectional) view, respectively. Boom segment 180 has tip fitting 310 coupled to its distal end. In this embodiment, tip fitting 310 has an outer surface or side 312 that has three equally spaced apart mounting structures 314, each of which has a pulley 316 coupled thereto. Each mounting structure 314 is a pair of plates that extend outward from the outer surface 312. Pulley 316 is rotatably mounted between the pair of plates of mounting structure 314. Pulley 316 is oriented so that the cable 600 can travel along the outer surface of boom segment 180, around the pulley 316 and then transition to the inside of boom segment 180 and travel back toward the proximal end of boom segment 180 between boom segment 180 and boom segment 200.

A latch 318 is also coupled to the tip fitting 310. The latch 318 is biased into a locking position so that when boom segment 200 is moved relative to boom segment 180 to its deployed or extended position, an opening in boom segment 200 aligns with latch 318, which engages that opening to lock or retain boom segment 200 in its deployed position.

Tip fitting 320 is coupled to the distal end of boom segment 200 and has an outer surface 322. Tip fitting 320 includes a latch 328 that functions similarly to latch 318. Latch 328 is positioned so that it can engage an opening in boom segment 220 to lock or retain boom segment 220 in its deployed position relative to boom segment 200. Tip fitting 320 also includes a mounting structure 324, which are a pair of spaced apart plates extending outward from tip fitting 320. A pulley mechanism 326 that includes a body and a rotatably mounted wheel located between the spaced apart plates of structure 324. The wheel of pulley mechanism 326 is mounted on the inside surface of the body of pulley mechanism 326. As a result, the portion of cable 600 that engages pulley mechanism 326 is located on the inside of boom segment 200 and extends therealong from the proximal end of boom segment 200 to pulley mechanism 326 at the distal end of boom segment 200, and back to the proximal end of boom segment 200. As shown in FIG. 12A, the tip fitting 320 includes a grooved portion 323 which, in combination with the pulley mechanism 326, matches the groove 205 formed in boom segment 200.

Also shown in FIGS. 12A and 12B are similar structures for tip fittings 330, 360, and 370. Tip fitting 330 includes a groove portion 340, a pulley mechanism 350 with an internally located wheel, and a latch mechanism 355. Similarly, tip fitting 360 includes a groove portion 363, a pulley mechanism 366 with an internally located wheel, and a latch mechanism 368. Also, tip fitting 370 includes a groove portion 373, a pulley mechanism 376 with an internally located wheel, and a latch mechanism 378. Cable 600 engages the wheels of each of the pulley mechanisms 326, 350, 366, and 376, and travels between respective ones of the boom segments.

A distal fitting or distal ring 520 is coupled to the distal end of innermost and smallest boom segment 280. The distal fitting 520 has a different structure than tip fittings 310, 320, 330, 360, and 370, and is described in greater detail below relative to FIG. 18.

Figure 13:
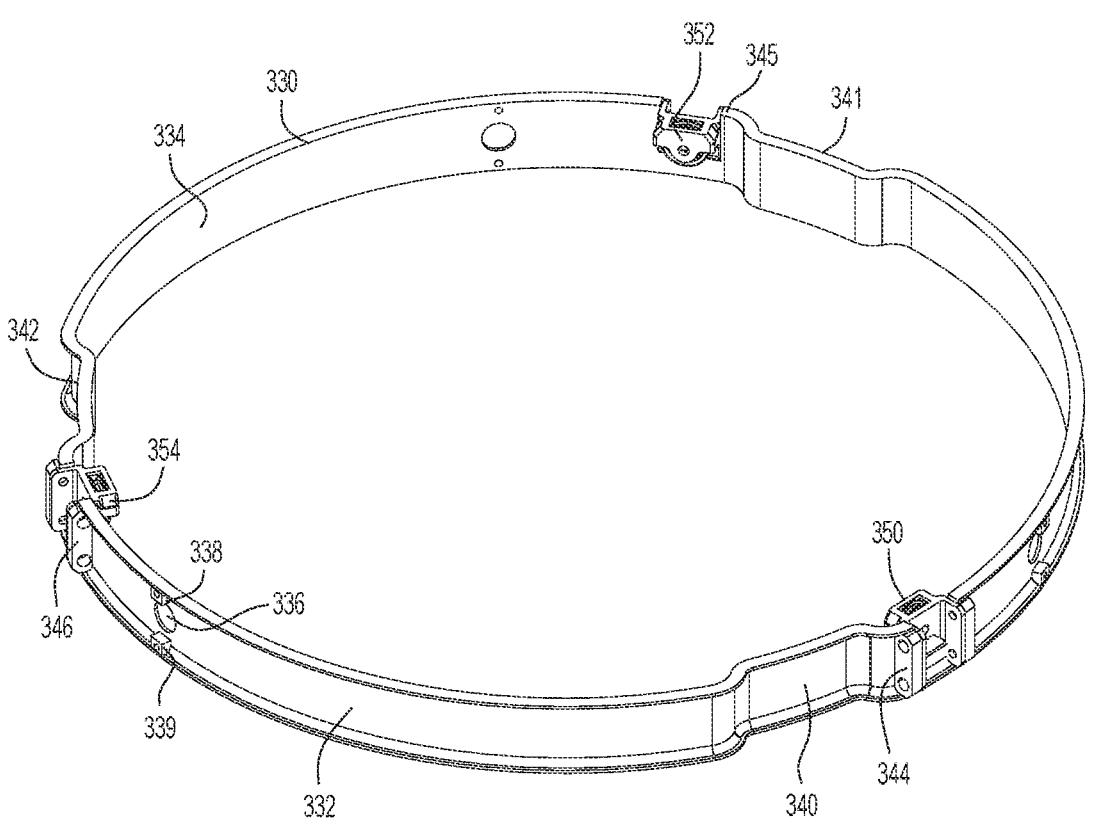
FIG. 13 is a perspective view of an embodiment of a tip fitting of the boom of FIG. 6.

Turning to FIG. 13, a perspective view of tip fitting 330 is illustrated. The following discussion relates to each of the other tip fittings 310, 320, 360, and 370, noting that there are slight differences, such as the relative sized of the groove portions, for example. Tip fitting 330 has a body with an outer surface 332 and an inner surface 334. Several through holes 336 are formed about the circumference of tip fitting 330. In one embodiment, each hole 336 is approximately ½ inches in diameter.

Located above and below each through hole 336 are panel insert portions 338 and 339, respectively, that are used to mount a latch so the latch can align with through hole 336. Tip fitting 330 also includes three equally spaced groove sections 340, 341, and 342, and three mounting structures 344, 345, and 346 to which pulley mechanisms 350, 354, and 356 are coupled, respectively. Each of the pulley mechanism 350, 354, and 356 includes two brackets with two holes each that can receive bolts to secure the pulley mechanism to the tip fitting 330.

Figures 14, 15:
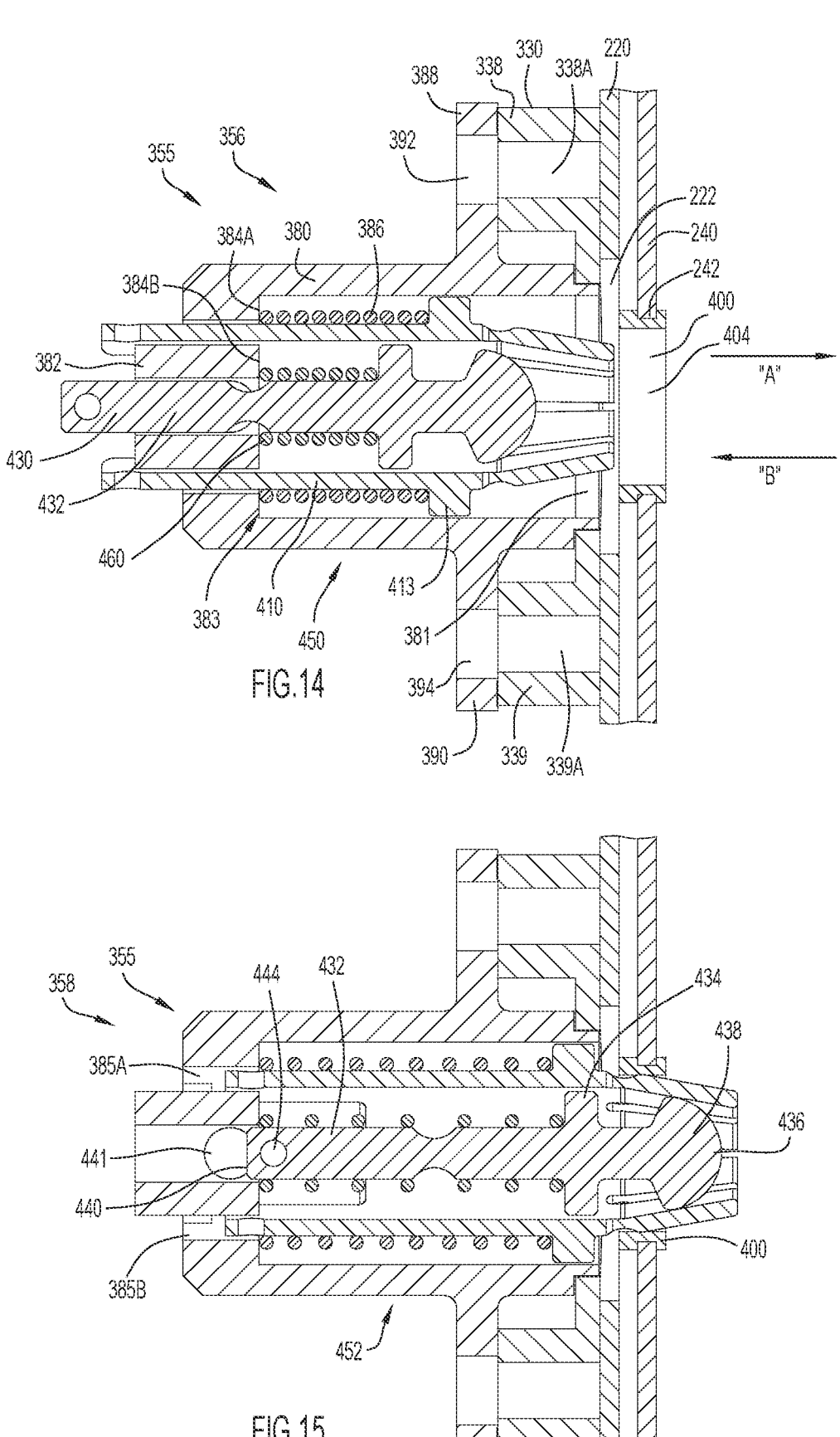
FIGS. 14 and 15 are side cross-sectional views of a latch of the boom of FIG. 6 in a retracted configuration and in a latched configuration, respectively.

The operation of one of the latches is now described, noting that each of the latches of boom 110 functions in a similar manner to each other. Turning to FIGS. 14 and 15, side cross-sectional views of latch 355 in a retracted configuration 356 (see FIG. 14) and in a latched or locked configuration 358 (see FIG. 15), respectively, are illustrated. While the illustrated embodiment includes three latches mounted to each tip fitting, any quantity of latches, such as six, may be mounted to each tip fitting.

Latch 355 includes a body 380 that has an inner end 381 and an outer end 382 opposite the inner end 381. The body 380 defines an internal channel 383 and includes an outer circular shoulder 384A and an inner circular shoulder 384B, that define slots 385A and 385B proximate to outer end 382 (see FIG. 15). A biasing member 386, such as a spring, is located in the internal channel 383, the function of which is described below. The latch 355 also includes one or more ball bearings 441 that help prevent the movement of plunger 430 once plunger 430 has been deployed.

Latch 355 also includes laterally outwardly extending flange portions 388 and 390 on opposite sides of the body 380. Flange portions 388 and 390 include openings or holes 392 and 394, respectively. A connector (not shown) can be inserted into opening 392 and aligned hole 338A in panel insert portion 338, and another connector can be inserted into opening 394 and aligned hole 339A in panel insert portion 339 to secure the latch 355 to tip fitting 330.

The tip fitting 330 is coupled to boom segment 220 and the latch 355 is aligned with an opening 222 formed therein. In addition, boom segment 240 has an opening 242 that is aligned with opening 222. A bushing 400 is inserted into opening 242 and has portions that are located between boom segments 220 and 240. In one embodiment, the bushing 400 is made of titanium, but in other embodiments, any material can be used. The bushing 400 is utilized with latch 355 to secure adjacent boom segments in their positions relative to each when extended or deployed. Each latch in telescopic boom 100 interacts with a corresponding bushing 400. In one embodiment, bushing 400 includes an opening 404 (see FIG. 14) through which a portion of latch member 410 and plunger 430 extend to retain the boom segments in their deployed positions.

The latch 355 includes a latch member 410 that has an outwardly extending radial flange 413 that is engaged by spring 386, which biases the latch member 410 along the direction of arrow "A" in FIG. 14. The latch member 410 includes an inner channel in which a plunger 430 is located. Referring to FIGS. 14 and 15, plunger 430 includes a body 432 that extends from inner end 436 to outer end 440. Extending outwardly radially from body 432 is a flange 434 that is engaged by a spring 460 that biases the plunger 430 along the direction of arrow "A" in FIG. 14 from an unlocked position 450 to a locked position 452. The body 432 also includes a bulbous portion 438 that engages with flexible fingers of the latch member 410 to expand the flexible fingers in the bushing 400.

The body 432 also includes a hole 444 proximate to end 440 through which an elongate member, such as a string or other flexible member, can be inserted so a user can pull on the elongate member to move the plunger 430 along the direction of arrow "B" in FIG. 14 from its locked position 452 to its unlocked position 450. When the plunger 430 is in its locked position 452, boom segment 240 cannot move relative to boom segment 220, and as a result, boom segment 240 is retained in its extended or deployed position. When the plunger 430 is in its unlocked position 450, boom segment 240 can move relative to boom segment 220, and as a result, boom segment 240 moves to its stowed position.

Figure 16:
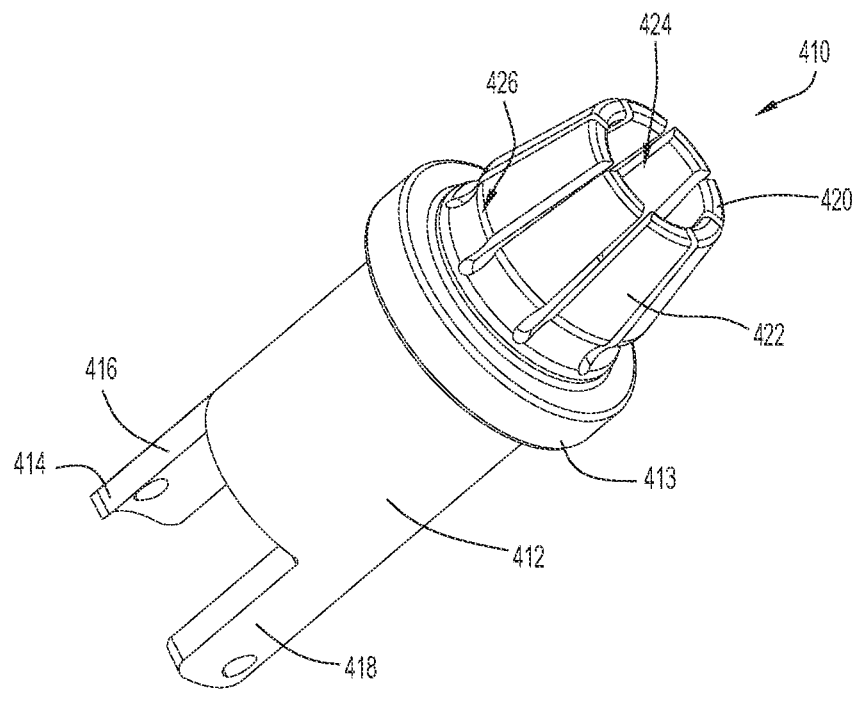
FIG. 16 is a perspective view of a latch of the boom of FIG. 6.

An embodiment of a latch member is illustrated in FIG. 16. Latch member 410 includes a body 412 that has an inner end 420 and an opposite outer end 414, and an outer flange 413 extending radially therefrom. Extending from body 412 are extensions 416 and 418, which move within slots 385A and 385B, respectively, in latch 355 as the latch member 410 moves back and forth. The latch member 410 also includes several resilient and flexible fingers 422 that collectively form an opening 424. A groove 426 extending around the outside of fingers 422 is provided to secure the latch member 410 within bushing 400 when the latch member 410 is in its locked position.

During operation, the flexure latch rides member along a surface of an inner, adjacent boom segment as the inner boom segment moves. When the latch member engages a bushing 400, it starts to engage the opening 404 of the bushing 400. The latch member geometrically releases ball bearings 441 that retain the plunger 380 in its deployed position. The plunger 380 preloads the latch member into the bushing 400. Once the end 420 of the latch member 410 is located in the bushing 400, the bulbous portion of the released plunger 380 engages the fingers 422 and expands them, which results in the groove 426 engaging the body 402 of the bushing 400.

Figure 17:
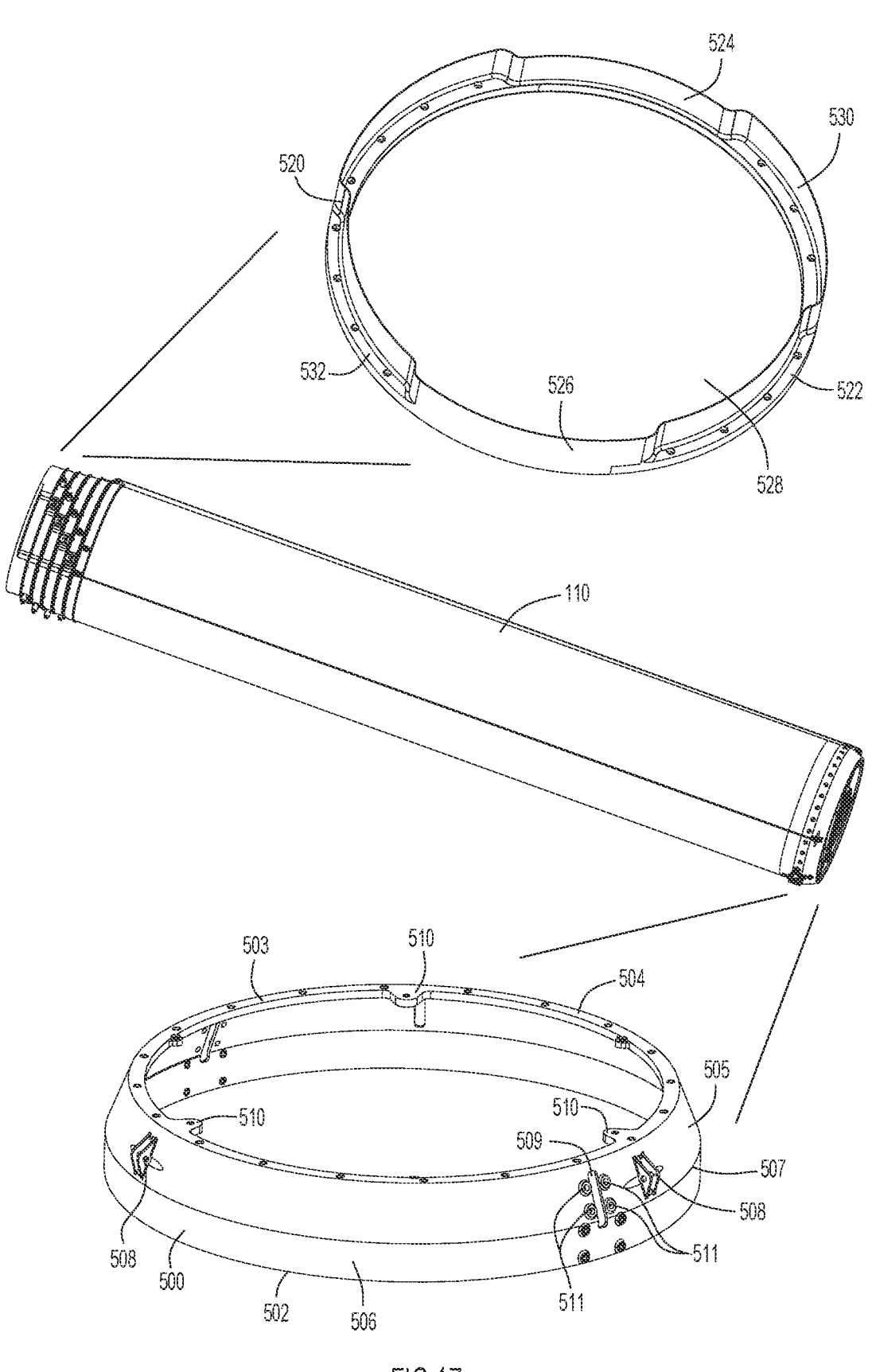
FIG. 17 is a perspective view of the boom of FIG. 6 showing perspective views of the distal ring and the base.

Turning to FIG. 17, a perspective view of the distal fitting and the base of telescopic boom 110 are illustrated. Distal fitting 520 is coupled to the distal end of the innermost boom segment 280, as mentioned above. The distal fitting 520 includes a body 522 with a generally circular shape. The body 522 has an outer surface 524 and an inner surface 526 that defines a through opening 528. The body 522 also includes several projections or extending surfaces 530 and 532 that extend into groove portions of the boom segment 280. Distal fitting 520 includes an interface (not shown) with a boom adjacent structure or payload.

Also shown in FIG. 17 is a perspective view of a base or root fitting of telescopic boom 110. Base 500 is bonded and riveted to the outer surface or outer diameter of the largest or outermost boom segment 180. Base 500 is the interface for drive bearings, restraints, and pulleys. In one embodiment, the base 500 has six total pulleys coupled thereto: three base pulleys for the three cables, and three corresponding idler pulleys. Base 500 also has two restraint brackets coupled thereto. An interface (not shown) to a boom adjacent structure or a payload is also coupled to the base 500.

Base 500 is coupled to the proximal end of the outermost boom segment 180. Base 500 has an inner end 502 that is coupled to boom segment 180 and an opposite outer end 504. Base 500 has a ring portion 503 that defines the outer end 504, a circular angled portion 505 that is integrally formed with ring portion 503, and a cylindrical portion 506 integrally formed with angled portion 505. Base 500 includes an outer surface 507 and three equally spaced apart mounts 508 extending from angled portion 505. Each mount 508 includes a pair of spaced apart plates between which a pulley is mounted. Each of those pulleys is engaged by one of the three cables of the boom 110. Base 500 includes multiple slots 509 formed therein, the function of which is described below. Proximate to each slot 509 is a series of openings 511 as well. Finally, the ring portion 503 has three inwardly directed tabs 510.

Figures 18, 19, 20:
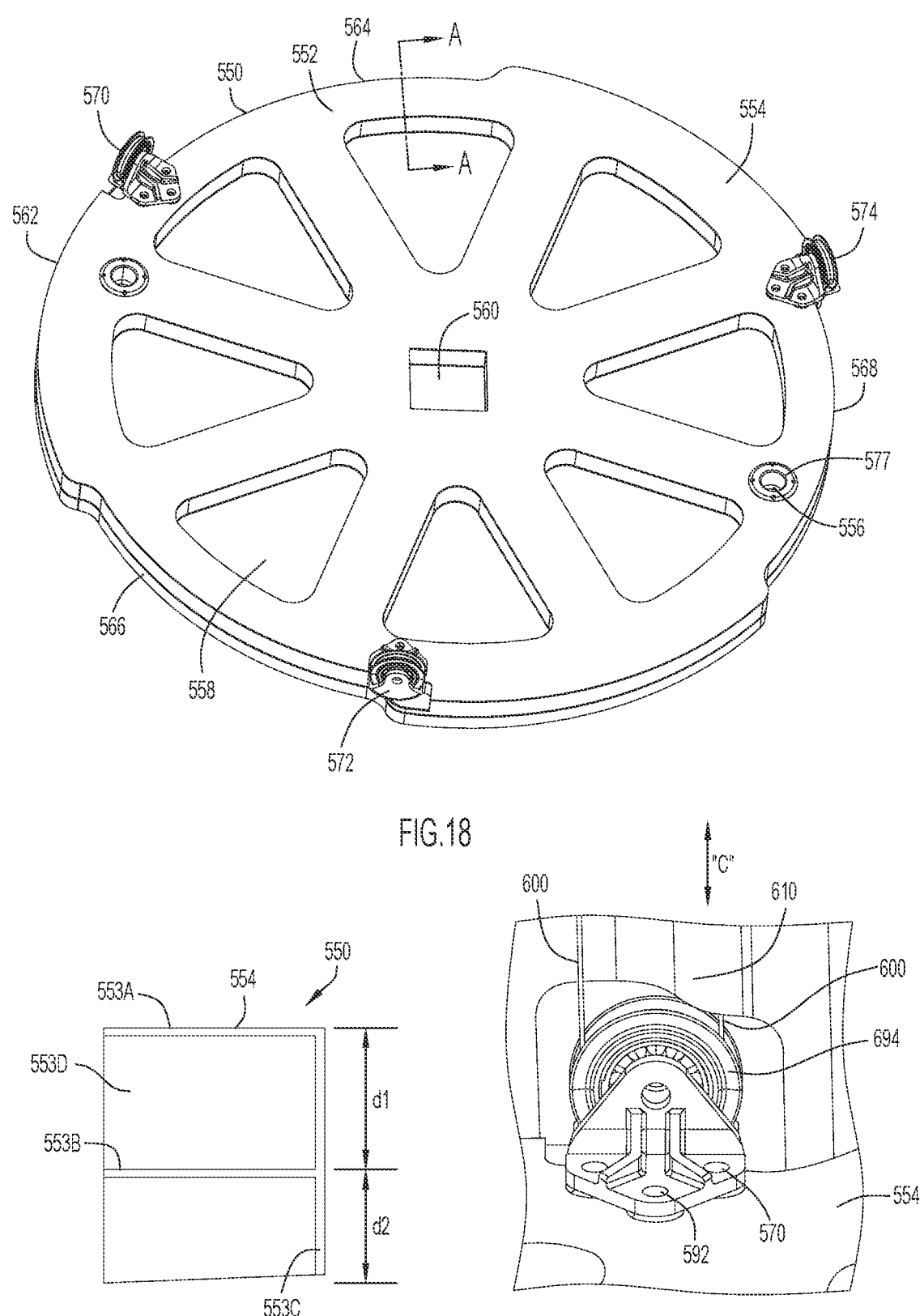
FIG. 18 is a perspective view of a base plate of the boom of FIG. 6.
FIG. 19 is a cross-sectional view of the base plate of FIG. 18 taken along the line "A-A".
FIG. 20 is a close-up perspective view of a pulley coupled to the base plate of FIG. 18.

Referring to FIGS. 18-20, various details of a base plate of the telescopic boom 110 are illustrated. Base plate 550, also referred to as a root fitting, is generally circular and has an outer surface that is configured to match the inner surface of the boom segment to which it is coupled. Referring to FIGS. 18 and 19, which is a cross-sectional view of base plate 550 taken along line "A-A" in FIG. 18, base plate 550 includes a body 552 with a facesheet layer 553A that forms an upper surface 554, and a core portion 553D. Coupled to core portion 553D is a horizontal plate 553B which is coupled to an outer vertical or side plate 553C (see FIG. 19). In this embodiment, core portion 553D has a thickness "d1" which is greater than the distance "d2" below the horizontal plate 553B.

Base plate 550 includes an insert 556 that is made from two portions coupled together from the top and the bottom surfaces of the base plate 550. The insert 556 includes a through opening 557 that receives a tension rod, as described in detail below. Base plate 550 includes several openings 558 spaced apart, which reduce the material used for base plate 550 and thereby reduce its overall weight. Base plate 550 also includes a central opening 560 that receives a portion of drive mechanism 700.

Base plate 550 has an outer perimeter 562 that includes several recessed portions 564, 566, and 568 that are configured to match the inner surface of the boom segment to which the base plate 550 is coupled. Base plate 550 is bonded to the inner surface of the corresponding boom segment.

Coupled to the upper surface 554 are several pulleys 570, 572, and 574 that are engaged by different ones of the cables 600, 602, and 604. Each of these pulleys 570, 572, and 574 is at the bottom of the travel of cable 600, 602, or 604 as that cable travels toward the proximal end of a boom segment, goes around the particular pulley, and travels toward the distal end of the boom segment. Accordingly, each of the pulleys 570, 572, and 574 can be referred to as a bottom pulley.

Referring to FIG. 20, a close-up perspective view of a bottom pulley is illustrated. In this embodiment, bottom pulley 570 includes a base 592 that is mounted to upper surface 554 of base plate 550. A pulley or wheel 594 is rotatably mounted to the base 592. Cable 600 extends around the wheel 594 and moves upward and downward along the directions of arrow "C". A channel 610 is formed in a boom segment so that a portion of the cable 600 can transition from the inner side of the boom segment to an outer side of the boom segment.

Figure 21:
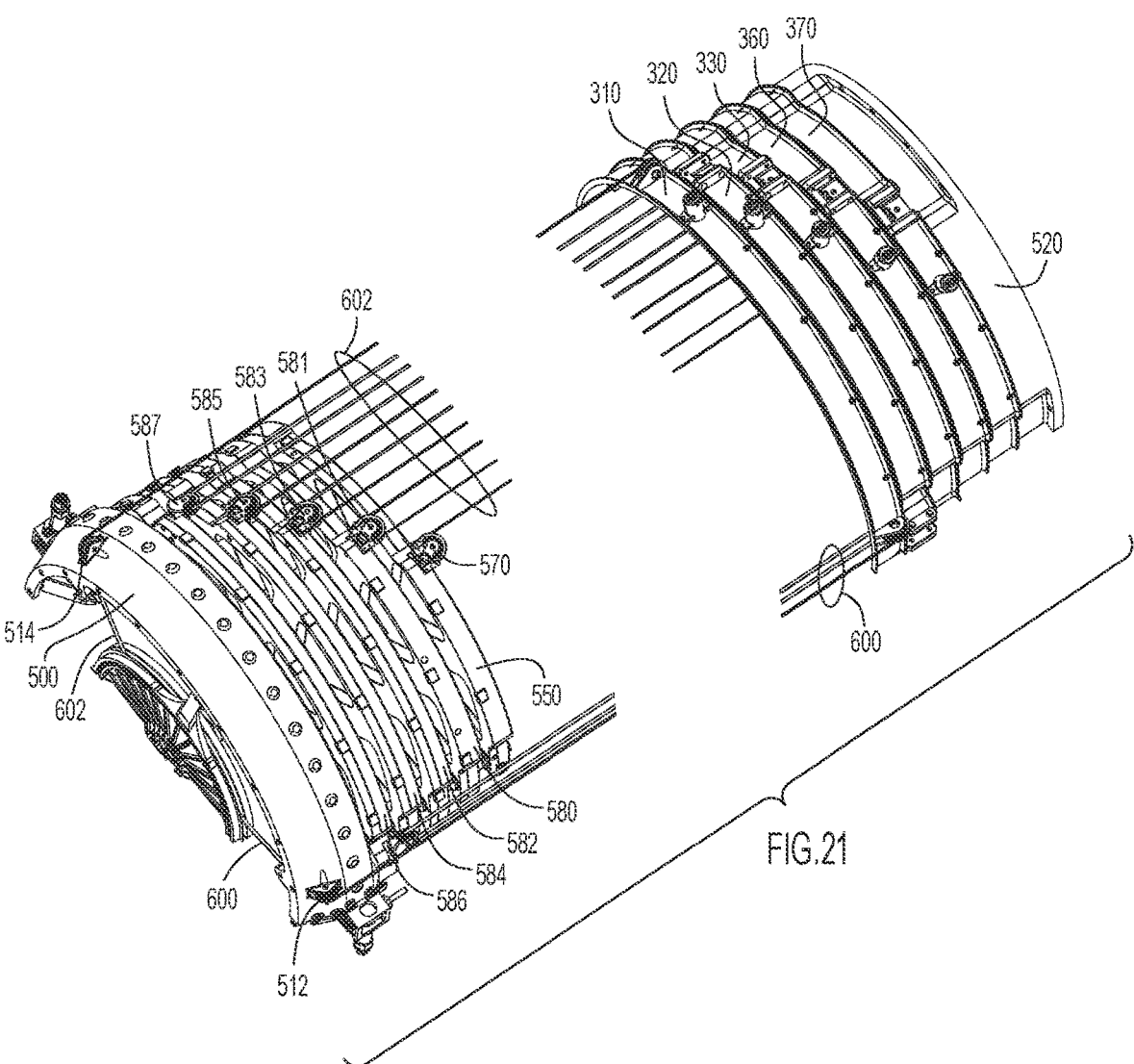
FIG. 21 is a perspective view of some components of the boom of FIG. 6 with the boom segments removed and the ends moved closer together.

Turning to FIG. 21, a perspective view of some components of telescopic boom 110 are illustrated with the boom segments removed and the ends of the boom 110 being brought closer together. At one end of boom 110, tip fittings 310, 320, 330, 360, and 370 and distal fitting 520 are located. At the other end of boom 110, the base 500 is shown without the boom segments. Base 500 includes pulley 512 around which cable 600 travels and pulley 514 around which cable 602 travels. Cable 600 travels around pulleys coupled to base plates or root fittings 550, 580, 582, 584, and 586. Similarly, cable 602 travels around pulleys 570, 581, 583, 585, and 587 which are coupled to the respective base plates.

Figure 22:
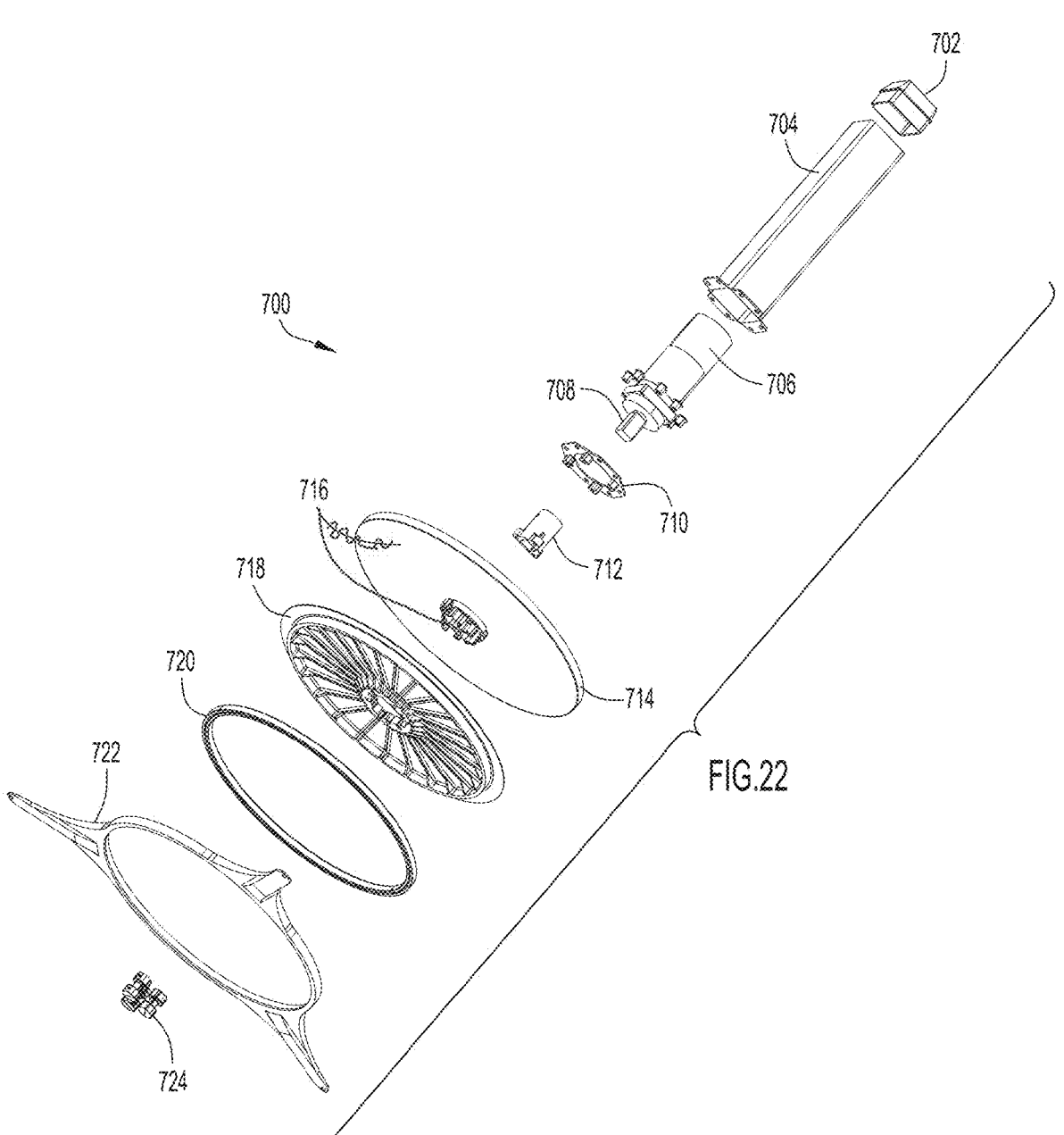
FIG. 22 is an exploded view of an embodiment of a drive system or drive assembly of the boom of FIG. 6.

Telescopic boom 110 also includes a drive system or drive assembly 700. As shown in FIG. 22, in this embodiment, the drive system 700 includes a torsion tube guide 702 that is mounted to a torsion tube or motor housing 704. Each of the guide 702 and the housing 704 has a generally square cross-sectional shape that matches the central opening 560 of each base plate. The motor housing 704 defines a cavity in which a motor or actuator 706 is located and retained therein via a motor mount bracket 710. The motor 706 has an output shaft 708 that engages a motor coupler 712.

The drive system 700 includes a spool 714 with projections 716 that engage with openings or holes formed in spool 718. The spools 714 and 718 are rotated by the motor 706 during operating. Cables 600, 602, and 604 are wound onto the spools 714 and 718 as they are rotated, which results in a tension being applied to each of the cables 600, 602, and 604. The drive system 700 also includes a radial bearing 720 and a bearing brace 722 that is used to retain the drive system components in position. A few cable termination fittings 724 are provided that are coupled to the ends of the cables 600, 602, and 604 to secure the cables 600, 602, and 604 to the spool.

Figure 23:
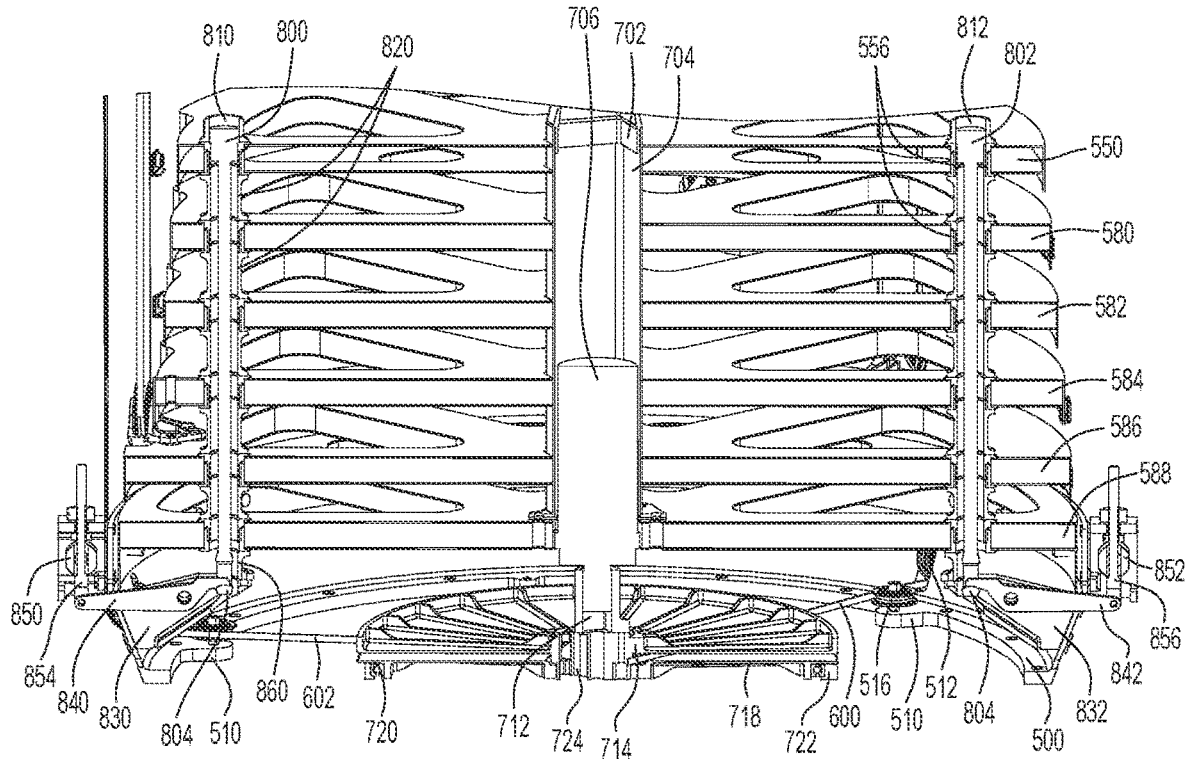
FIG. 23 is a cross-sectional view of some components of the boom of FIG. 6 that relate to the drive system thereof.

Referring to FIG. 23, a cross-sectional view of some components of telescopic boom 110 is illustrated. Base plates 550, 580, 582, 584, 586, and 588 are illustrated showing the inserts 556 coupled thereto. In this embodiment, a restraint system includes a pair of tension rods 800 and 802 that pass through the inserts 556 in the base plates. The tension rods 800 and 802 extend from first ends proximate to nuts 810 and 812 to opposite second ends that are engaged with restraint pawls 840 and 842 and near nuts 860. Located between inserts 556 in adjacent base plates are compression links 820 which maintain spacing between the base plates. The tension rods 800 and 802 are preloaded for launch or deployment of the boom segments.

Coupled to base 500 are restraint brackets 830 and 832 to which restraint pawls 840 and 842 are pivotably mounted, respectively. One end of restraint pawl 840 is coupled to a drive end 854 of restraint 850, which can move the drive end 854 to cause the restraint pawl 840 to move as well. Similarly, one end of restraint pawl 842 is coupled to a drive end 856 of restraint 852, which can move the drive end 856 to cause the restraint pawl 842 to move also. The opposite end of restraint pawl 840 is engaged with a lower end 804 of tension rod 800 via an opening in the lower end 804. When the restraint pawl 840 is engaged with the tension rod lower end 804, the tension rod 800 is prevented from moving. Similarly, restraint pawl 842 has an end that is engaged with lower end 804 of tension rod 802 to prevent tension rod 802 from moving.

Referring to FIG. 23, coupled to each tab 510 of base 500 is a pulley 516 that guides a respective cable toward the spools 714 and 718. Cable termination fittings 724 are illustrated between spools 714 and 718, which, as mentioned above, retain the cables 600, 602, and 604 coupled to the spool formed by spools 714 and 718. Cable 600 passes around pulley 512 and cable 602 similarly passes around a pulley mounted to base 500.

The other drive system components are shown, including the motor coupler 712, which couples the motor to the spool, the radial bearing 720 and the bearing brace 722. In addition, the motor housing 704 is shown extending through all of the base plates and having the torsion tube guide 702 coupled thereto. The motor 706 is shown in the motor housing 704 as well.

Figure 24:
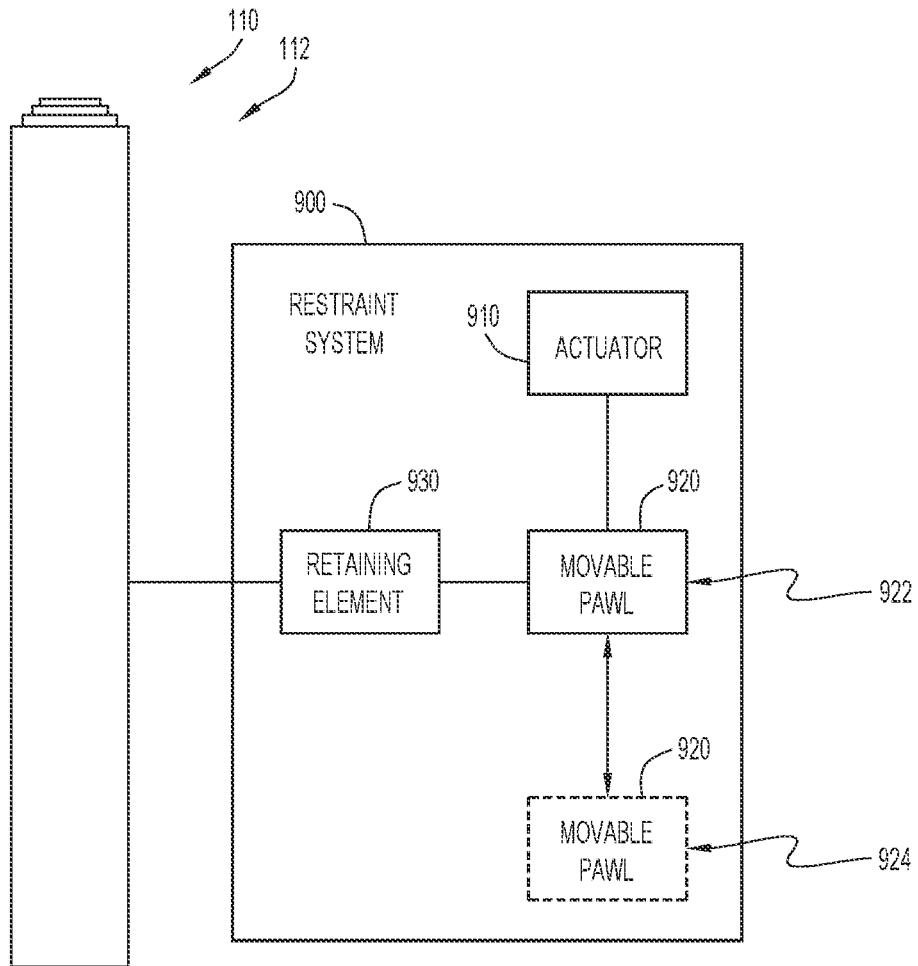
FIG. 24 is a schematic diagram of an embodiment of a restraint system according to the present invention.

Referring to FIG. 24, a schematic diagram of an embodiment of a restraint system according to the present invention is illustrated. In this embodiment, restraint system 900 includes an actuator 910 that can be manipulated by a user to activate or release the restraint system 900. The actuator 910 is engaged with a movable pawl 920 that is positionable in a locking position 922 and in an unlocking position 924. When the pawl 920 is in its locking position 922, it engages with a retaining element 930 that contacts the segments of the boom 110 to retain the boom 110 in its stowed or nested configuration 112. When the pawl 920 moves to its unlocking position 924, the pawl 920 disengages from the retaining element 930, thereby allowing the boom 110 to move a deployed configuration. In various embodiments of the present invention, the particular restraint system can vary in terms of components and elements provided that the restraint system retains the boom in its stored configuration, and that the restraint system can be actuated and released so the boom can move to its deployed configuration.

Figure 25:
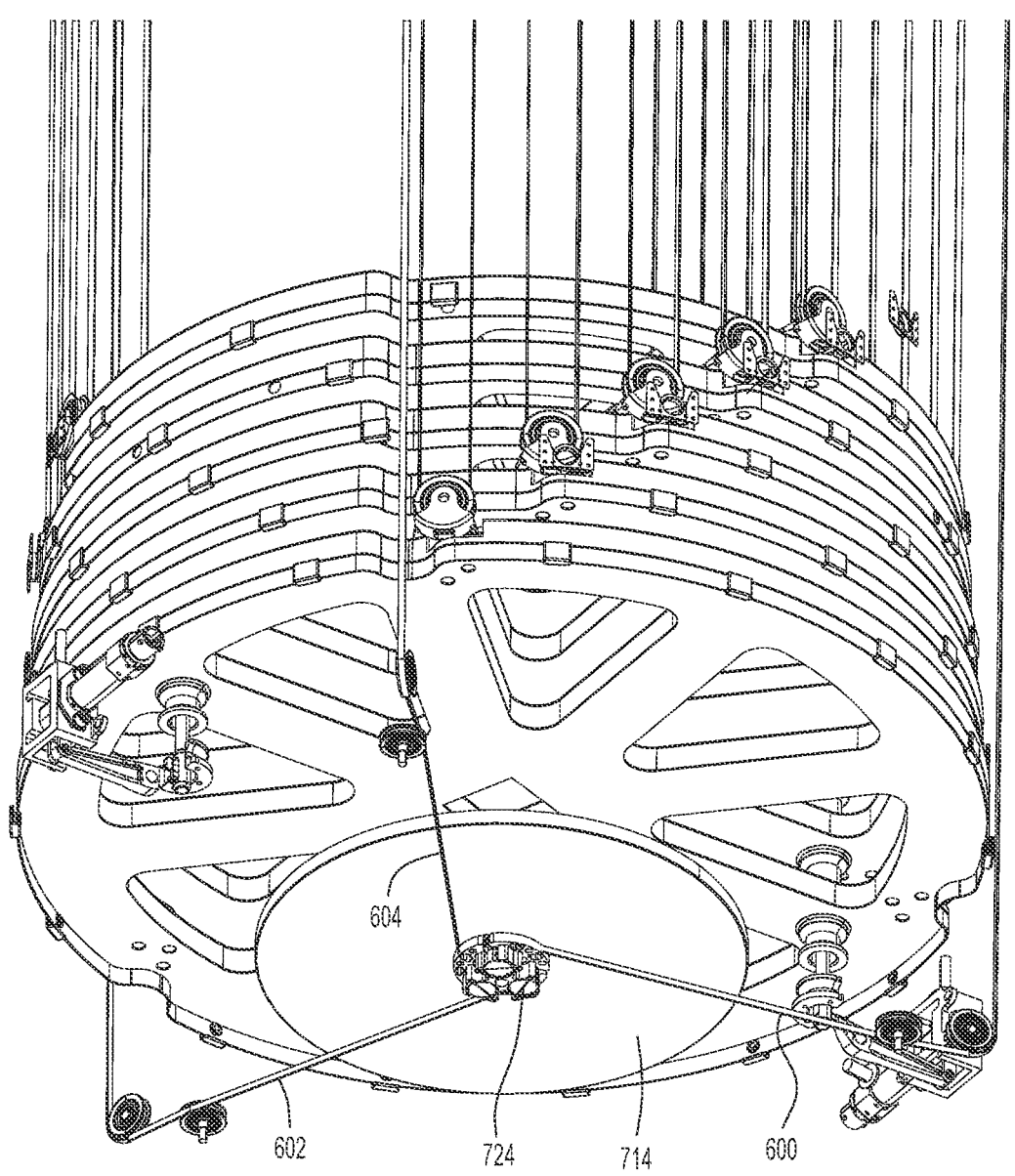
FIG. 25 is another cross-sectional view of some components of the boom of FIG. 6 that relate to the drive system thereof.

Referring to FIG. 25, many components of telescopic boom 110 have been removed for easier reference. Each of the cables 600, 602, and 604 is coupled to spool 714 via cable termination fittings 724. When the motor rotates the spool 714, tension is equally applied to each of the cables 600, 602, and 604, thereby causing the boom segments to move to their deployed or extended positions.

Figure 26:
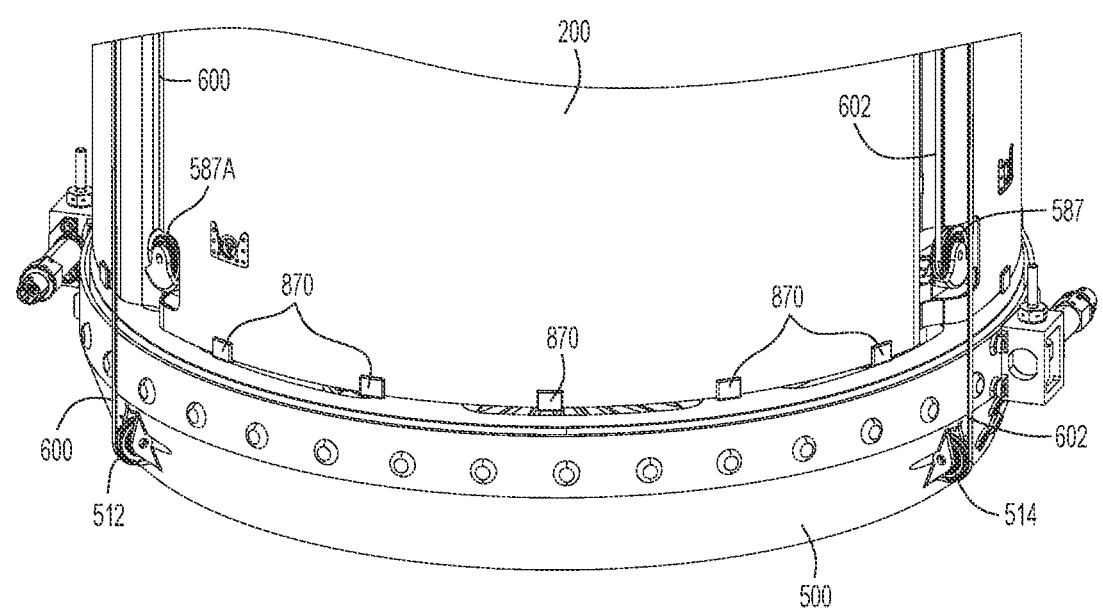
FIG. 26 is a close-up perspective view of some components of the boom of FIG. 6.

Turning to FIG. 26, a close-up perspective view of the lower end of boom 110 is illustrated. In this view, the outermost boom segment 180 has been removed. Also shown are cables 600 and 602 and their engagement with pulleys 512 and 514 and with pulleys 587 and 587A. Mounted to boom segment 200 are several fitting pads or couplers 870. The fitting pads or couplers 870 are utilized to distribute loads between different boom segments. The pads 870 are located at tip and root fittings, and bonded to the relevant structures.

Figure 27:
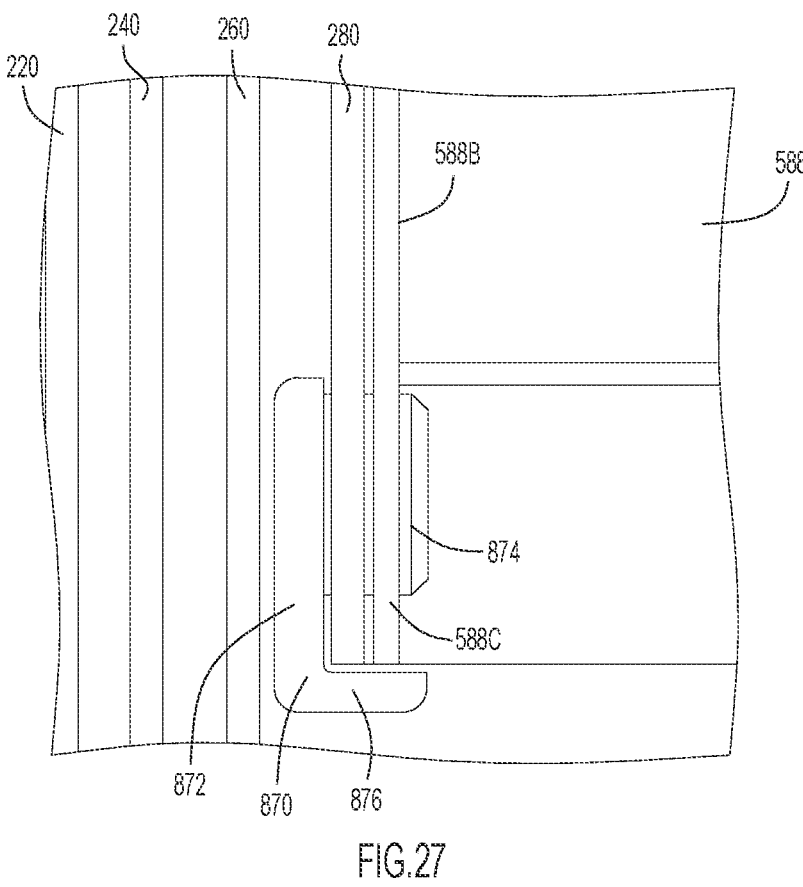
FIG. 27 is a close-up cross-sectional view of a few components of the boom of FIG. 6.
Figure 28:
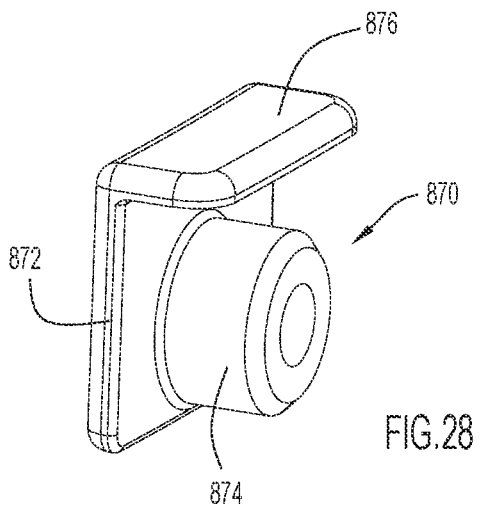
FIG. 28 is a perspective view of an embodiment of a coupler of the boom of FIG. 6.

Referring to FIGS. 27 and 28, coupler 870 includes a body portion 872 with a projection 874 extending therefrom and a lateral portion 876 coupled to the body portion 872. As shown in FIG. 27, the projection 874 is inserted into aligned openings or holes formed in both boom segment 280 and in the lower portion 588C of side plate 588B of root fitting 588. Later portion 876 is located beneath the bottom ends of boom segment 280 and root fitting 588. As a result, each coupler 870 connects one of the boom segments with one of the root fittings or bases. As shown in FIG. 26, several couplers 870 are used for each base.

Figure 29:
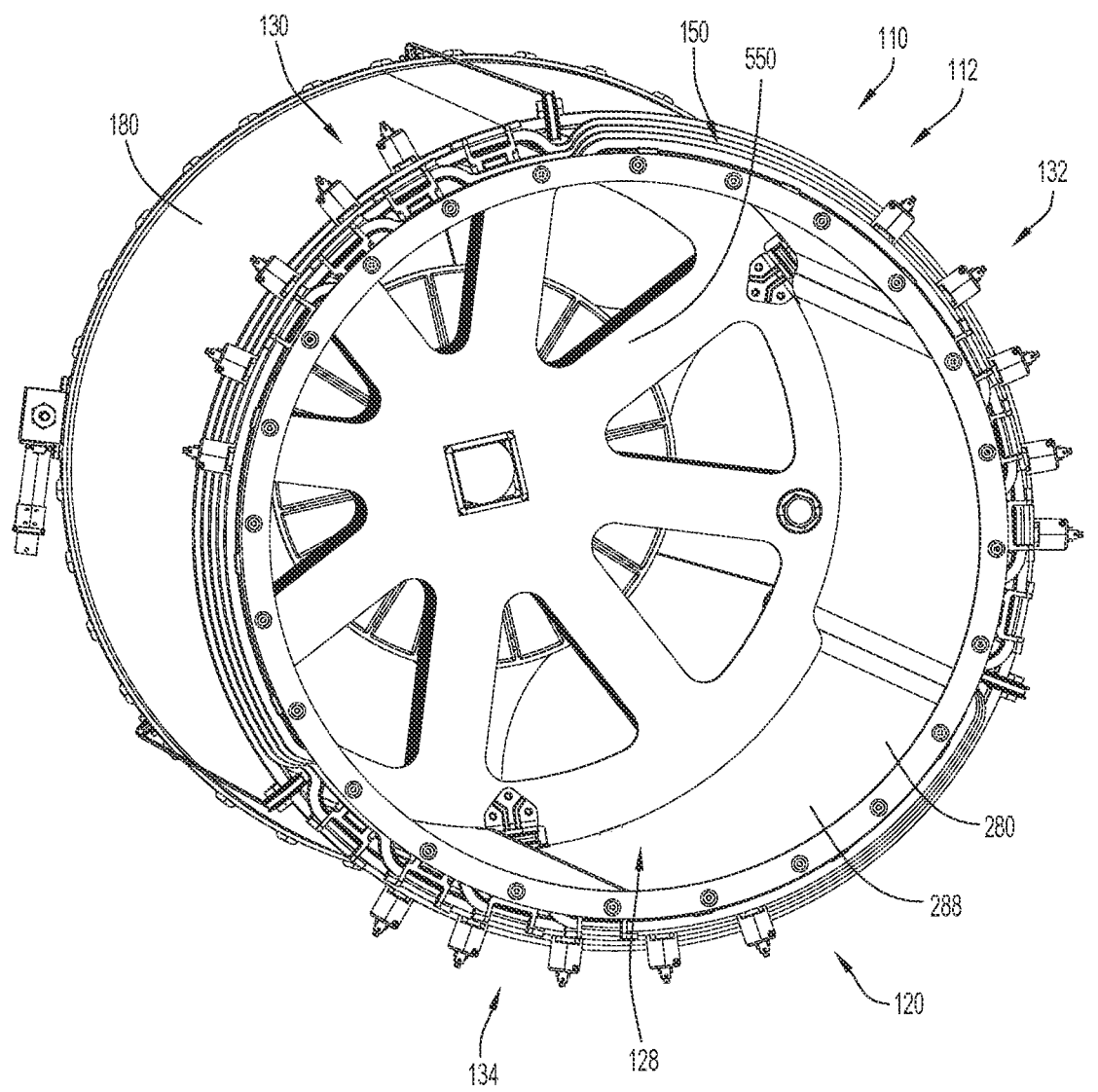
FIG. 29 is an end perspective view of the boom of FIG. 6 in its stowed configuration.
Figure 30:
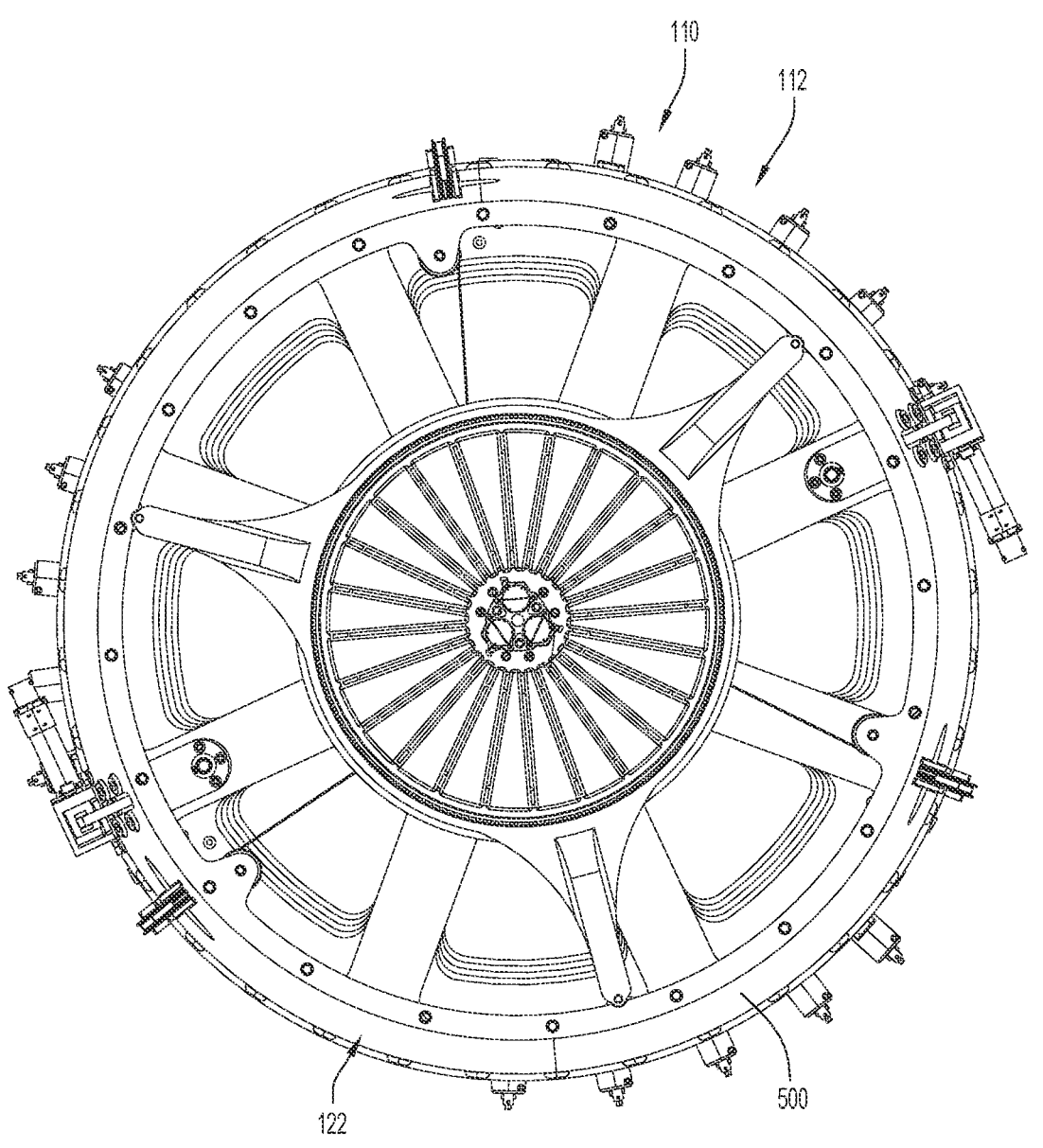
FIG. 30 is an end view of the boom of FIG. 6 in its stowed configuration.

Referring to FIG. 29, an end perspective view of the telescopic boom 110 in its stowed configuration 112 is illustrated. In this view, the base or root fitting 550 coupled to boom segment 280 is shown. The outer surface of base 550 matches the inner surface 288 of boom segment. In this embodiment, the boom 110 includes pulley sets 130, 132, and 134. Referring to FIG. 30, a view of end 122 of telescopic boom 110 is shown.

In one embodiment, many of the components of the telescopic boom 110 are made of aluminum.

Like numbers refer to like elements throughout. The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

It will also be understood that, as used herein, the terms "alternative," example," "exemplary," and derivatives thereof are intended to refer to non-limiting examples and/or variants embodiments discussed herein, and are not intended to indicate preference for one or more embodiments discussed herein compared to one or more other embodiments. The invention being thus described, it will be apparent that the same may be varied in many ways. Such variations are not to be regarded as a departure from the spirit and scope of the invention, and all such modifications as would be obvious to one skilled in the art are to be included within the scope of the following claims.

What is claimed is:

1. A telescopic boom positionable in a stowed configuration and in a deployed configuration, the telescopic boom comprising:

a first boom segment having a first end and a second end opposite the first end, the first boom segment having an outer surface and an inner surface opposite its outer surface;

a second boom segment having its own first end and its own second end opposite its own first end, the second boom segment being positionable inside the first boom segment, the second boom segment having an outer surface and an inner surface opposite its outer surface, the first boom segment and the second boom segment have a common longitudinal axis; and a drive mechanism connected to each of the first boom segment and the second boom segment, the drive mechanism including a cable and a motor that can apply tension to the cable, the cable is engaged with the first boom segment at a first location proximate to the first end of the first boom segment and at a second location proximate to the second end of the first boom segment, the cable is engaged with the second boom segment at a third location proximate to the first end of the second boom segment and at a fourth location proximate to the second end of the second boom segment, wherein the cable extends continuously between the first location, the second location, the third location, and the fourth location, and the drive mechanism can be actuated to apply tension to the cable to move the telescopic boom from its stowed configuration to its deployed configuration and wherein the cable from the first location to the second location extends along the outer surface of the first boom segment, the cable from the second location to the third location extends along and is between the inner surface of the first boom segment and the outer surface of the second boom segment, the cable from the third location to the fourth location extends along the inner surface of the second boom segment, and after the cable engages the fourth location, the cable extends along the inner surface of the second boom segment, and the cable extends parallel to the longitudinal axis between the first location, the second location, the third location, and the fourth location.

2. The telescopic boom of claim 1, wherein the first boom segment has a first pulley at the first location and a second pulley at the second location, the second boom segment has a third pulley at the third location and a fourth pulley at the fourth location, and the cable engages each of the first pulley, the second pulley, the third pulley, and the fourth pulley.

3. The telescopic boom of claim 2, wherein the first end of the second boom segment is proximate to the first end of the first boom segment when the telescopic boom is in its stowed configuration, and the second end of the second boom segment is proximate to the first end of the first boom segment when the telescopic boom is in its deployed configuration, the cable remaining engaged with the first pulley, the second pulley, the third pulley, and the fourth pulley in both the stowed configuration and the deployed configuration.

4. The telescopic boom of claim 1, wherein the cable is a first cable, the drive mechanism includes a second cable and a third cable, the first cable, the second cable, and the third cable being equally spaced apart around a circumference of the first boom segment, and each of the second cable and the third cable engaging the first boom segment proximate to its first end and its second end and engaging the second boom segment proximate to its first end and its second end.

5. The telescopic boom of claim 4, wherein the first boom segment has a first set of pulleys, a second set of pulleys, and a third set of pulleys, the second boom segment has a fourth set of pulleys, a fifth set of pulleys, and a sixth set of pulleys, the first cable engaging the first set of pulleys and the fourth set of pulleys, the second cable engaging the second set of pulleys and the fifth set of pulleys, and the third cable engaging the third set of pulleys and the sixth set of pulleys.

6. The telescopic boom of claim 1, wherein the second boom segment includes a tube tip fitting coupled to its first end, the tube tip fitting including an outer side and an inner side, the tube tip fitting including a pulley coupled thereto, the pulley being located on the inner side of the tube tip fitting.

7. The telescopic boom of claim 1, further comprising:

a base coupled to the second end of the first boom segment; and a restraint pawl movably coupled to the base, the restraint pawl being disposable in a stowed position in which the restraint pawl prevents the telescopic boom from moving from its stowed configuration to its deployed configuration and in a deployed position in which the restraint pawl allows the telescopic boom to move from its stowed configuration to its deployed configuration.

8. The telescopic boom of claim 1, wherein each of the first boom segment and the second boom segment includes a base plate coupled proximate to its second end, each of the base plates includes an opening extending therethrough, and the telescopic boom further comprises:

a restraint system that is used to lock the boom segments together in stowed positions in which the telescopic boom is prevented from moving from its stowed configuration to its deployed configuration.

9. The telescopic boom of claim 8, further comprising:

a coupler having a projection extending therefrom, the coupler being engaged with the second boom segment, the projection extending through a first hole in the second boom segment and a second hole in the base plate of the second boom segment, thereby coupling the base plate of the second boom segment to the second boom segment.

10. The telescopic boom of claim 1, further comprising:

a third boom segment having opposite ends and being positionable inside the second boom segment, the third boom segment having a fifth location proximate to one of its ends and a sixth location proximate to the other of its ends;

a fourth boom segment having opposite ends and being positionable inside the third boom segment, the fourth boom segment having a seventh location proximate to one of its ends and an eighth location proximate to the other of its ends; and a fifth boom segment having opposite ends and being positionable inside the fourth boom segment, the fifth boom segment having a ninth location proximate to one of its ends and a tenth location proximate to the other of its ends, wherein the cable engages the third boom segment at the fifth location and at the sixth location, the fourth boom segment at the seventh location and at the eighth location, and the fifth boom segment at the ninth location and at the tenth location.

11. The telescopic boom of claim 10, wherein the third boom segment has a fifth pulley at the fifth location and a sixth pulley at the sixth location, the fourth boom segment has a seventh pulley at the seventh location and an eighth pulley at the eighth location, the fifth boom segment has a ninth pulley at the ninth location, and the cable engages each of the fifth pulley, sixth pulley, seventh pulley, eighth pulley, and ninth pulley.

12. The telescopic boom of claim 10, wherein each of the first boom segment, the second boom segment, the third boom segment, the fourth boom segment, and the fifth boom segment includes at least one latch assembly, and each latch assembly has a retracted configuration and a latched configuration, each latch assembly being mounted on one of the boom segments and engaging another of the boom segments to retain adjacent boom segments in deployed positions.

13. The telescopic boom of claim 12, wherein each latch assembly includes a spring-biased plunger that is preloaded so that the latch assembly engages a corresponding bushing in an adjacent boom segment when the boom segments are moved to deployed positions.

14. The telescopic boom of claim 10, wherein each of the first boom segment, the second boom segment, the third boom segment, the fourth boom segment, and the fifth boom segment has a cross-sectional shape that is different from the cross-sectional shapes of the other boom segments.

15. The telescopic boom of claim 14, wherein the second boom segment has a first groove formed therein and extending therealong, the third boom segment has a second groove formed therein and extending therealong, the second groove being larger than the first groove, the fourth boom segment has a third groove formed therein and extending therealong, the third groove being larger than the second groove, the fifth boom segment has a fourth groove formed therein and extending therealong, the fourth groove being larger than the third groove, and the cable is located in each of the first groove, the second groove, the third groove, and the fourth groove.

16. The telescopic boom of claim 15, wherein when the telescopic boom is in its stowed configuration, the first groove is located in the second groove, the second groove is located in the third groove, and the third groove is located in the fourth groove.

17. The telescopic boom of claim 10, wherein the cable engages the fifth location on the third boom segment after the cable engages the fourth location on the second boom segment, the third boom segment has an inner surface and an outer surface, the fourth boom segment has an inner surface and an outer surface, the fifth boom segment has an inner surface and an outer surface, and the cable from the fourth location to the fifth location extends along and is between the inner surface of the second boom segment and the outer surface of the third boom segment.

18. The telescopic boom of claim 17, wherein the cable from the fifth location to the sixth location extends along and is between the inner surface of the third boom segment and the outer surface of the fourth boom segment, and the cable from the sixth location to the seventh location extends along and is between the inner surface of the third boom segment and the outer surface of the fourth boom segment.

19. A telescopic boom positionable in a stowed configuration and in a deployed configuration, the telescopic boom comprising:

a first boom segment having a first end and a second end opposite the first end, the first boom segment having an outer surface and an inner surface opposite its outer surface;

a second boom segment having its own first end and its own second end opposite its own first end, the second boom segment being positionable inside the first boom segment, the second boom segment having an outer surface and an inner surface opposite its outer surface, the second boom segment having a first groove formed therein and extending therealong;

a drive mechanism connected to each of the first boom segment and the second boom segment, the drive mechanism including a cable and a motor that can apply tension to the cable, the cable is engaged with the first boom segment at a first location proximate to the first end of the first boom segment and at a second location proximate to the second end of the first boom segment, the cable is engaged with the second boom segment at a third location proximate to the first end of the second boom segment and at a fourth location proximate to the second end of the second boom segment, wherein the cable extends continuously between the first location, the second location, the third location, and the fourth location, and the drive mechanism can be actuated to apply tension to the cable to move the telescopic boom from its stowed configuration to its deployed configuration and wherein the cable from the first location to the second location extends along the outer surface of the first boom segment, the cable from the second location to the third location extends along and is between the inner surface of the first boom segment and the outer surface of the second boom segment, the cable from the third location to the fourth location extends along the inner surface of the second boom segment, and after the cable engages the fourth location, the cable extends along the inner surface of the second boom segment, a third boom segment opposite ends and being positionable inside the second boom segment, the third boom segment having a fifth location proximate to one of its ends and a sixth location proxime to the other of its ends, the third boom segment having a second groove formed therein and extending therealong, the second groove being larger than the first groove, and the cable is located in the first groove and the second groove.

20. The telescopic boom of claim 19, wherein when the telescopic boom is in its stowed configuration, the first groove is located in the second groove.

* * * * *